United States Patent [19]
Venable et al.

[11] Patent Number: 5,701,479
[45] Date of Patent: Dec. 23, 1997

[54] PIPELINED IMAGE PROCESSING SYSTEM FOR A SINGLE APPLICATION ENVIRONMENT

[75] Inventors: Dennis L. Venable, Rochester, N.Y.; Takashi Nagao, Kanagawa, Japan

[73] Assignees: Xerox Corporation, Stamford, Conn.; Fuji Xerox Company, Ltd., Tokyo, Japan

[21] Appl. No.: 402,225

[22] Filed: Mar. 10, 1995

Related U.S. Application Data

[63] Continuation-in-part of Ser. No. 76,678, Jun. 15, 1993, Pat. No. 5,557,795.

[51] Int. Cl.⁶ .................................................. G06F 9/455
[52] U.S. Cl. .......................... 395/670; 395/500; 395/677; 364/228; 364/231.8
[58] Field of Search .................................. 395/650, 700, 395/670, 500

[56] References Cited

U.S. PATENT DOCUMENTS

| | | |
|---|---|---|
| 3,909,797 | 9/1975 | Goss et al. . |
| 4,296,470 | 10/1981 | Fairchild et al. . |
| 4,486,831 | 12/1984 | Wheatley et al. . |
| 4,488,227 | 12/1984 | Miu et al. . |
| 4,493,019 | 1/1985 | Kim et al. . |
| 4,541,114 | 9/1985 | Rutenbar et al. . |
| 4,658,354 | 4/1987 | Nukiyama . |
| 4,811,413 | 3/1989 | Kimmel . |
| 4,845,663 | 7/1989 | Brown et al. . |
| 4,949,390 | 8/1990 | Iverson et al. . |
| 4,982,402 | 1/1991 | Beaven et al. . |
| 5,007,100 | 4/1991 | D'Aoust et al. . |
| 5,020,115 | 5/1991 | Black . |

(List continued on next page.)

FOREIGN PATENT DOCUMENTS

| | | |
|---|---|---|
| 357 444 | 3/1990 | European Pat. Off. . |
| 536 073 | 4/1993 | European Pat. Off. . |

OTHER PUBLICATIONS

Dennis, J.B., "Control Flow and Data Flow: Concepts of Distributed Programming," *Static Data Flow Computation*, 1987, pp. 355–363.

McLauchlan P F 'Horatio: libraries for vision applications', 15 Dec. 1992, UK, Ouel 1967/1992; p. 56, para. 9 —p.63, para. 7 and 8.

Electronic Imaging '88: International Electronic Imaging Exposition and Conference. Advance Printing of Paper Summaries. Boston, MA, USA, 3–6 Oct. 1988, 1988, Waltham, MA, USA Inst. Graphic.

Commun, USA, pp. 915–917 vol. 2, Walsh P M et al 'Reconfigurable access library for pipeline architecture image processing workstations and target systems'—the whole document.

Journal of Parallel and Distributed Computing, vol. 2, No. 1, Feb. 1985 pp. 50–78, XP 000048281, Kent E W et al 'Pipe. (Pipeline Image-Processing Engine)'—the whole document.

*Primary Examiner*—Lucien U. Toplu
*Assistant Examiner*—Majid A. Banankhah
*Attorney, Agent, or Firm*—Oliff & Berridge

[57] ABSTRACT

A system and method for pipelined data processing emulates multi-tasking pipelined data processing in a single tasking environment. A host application running in the single tasking environment creates a pipeline of linked data processing tasks to process data from a data source and to provide the processed data to the host application. As each data processing task of the pipeline is created, the task calls an external procedure to obtain header data indicative of the data to be received by the task. Each task alters the obtained header data to reflect the data processing operation to be performed by the task, then the task creates an external procedure callable by other tasks or the host application. The external procedure provides the processed header data from within a task to the calling task or host application. After all tasks of the pipeline are created the host application invokes the pipeline to obtain processed data from the pipeline.

23 Claims, 19 Drawing Sheets

U.S. PATENT DOCUMENTS

| | | |
|---|---|---|
| 5,097,326 | 3/1992 | Meijer . |
| 5,175,854 | 12/1992 | Cheung et al. . |
| 5,317,718 | 5/1994 | Jouppi . |
| 5,371,860 | 12/1994 | Mura et al. . |
| 5,396,616 | 3/1995 | Venable . |
| 5,420,981 | 5/1995 | Ivie et al. ................................. 395/200 |
| 5,524,250 | 6/1996 | Chesson et al. ........................ 395/775 |
| 5,526,484 | 6/1996 | Casper et al. ...................... 395/200.14 |
| 5,557,795 | 9/1996 | Venable et al. ......................... 395/650 |

```
/************************************************************/
/**                                                        **/
/**                  EXAMPLE FUNCTION                      **/
/**                                                        **/
/************************************************************/
     /*Task data structures*/
 1   typedef struct _task              /*general Task data structure*/
 2     {
 3     int (*channel1) ();             /*first channel procedure*/
 4     int (*channel2) ();             /*second channel procedure*/
 5     struct _task *blink;            /*backward link*/
 6     } task;

7   typedef struct                    /*Math subclass data structure*/
 8     {
 9     Task task;                      /*inherit Task data structure*/
10     int aval;                       /*channel 1 addend*/
11     int mval;                       /*channel 2 multiplicand*/
12     } MathTask;

/*procedures */
13   Task *initMathTask();             /*task initialization function*/
14   static int do_add();              /*channel 1 procedure*/
15   static int do_mul();              /*channel 2 procedure*/

/************************************************************/
/**                                                        **/
/**      Create and initialize a Math task                 **/
/**                                                        **/
/************************************************************/

16   Task *
17   initMathTask(avalue, mvalue, link)
18   int avalue;                       /*channel 1 addend value*/
19   int mvalue;                       /*channel 2 multiplicand value */
20   Task *link;                       /*backward link*/
       {
```

FIG.5A

```
     /*create the task data structure */
21   MathTask *mtask = (MathTask *)calloc(1,sizeof(MathTask));

/*initialize channel procedures */
22   mtask→task.channel1 = do_add;
23   mtask→task.channel2 = do_mul;

/*initialize backward link */
24   mtask→task.blink = link;

/*initialize state parameters*/
25   mtask→aval = avalue;
26   mtask→mval = mvalue;

/*return task data structure */
27   return ((Task *)mtask);
     }
```

FIG.5B

```
/**************************************************************/
/**                                                          **/
/** Channel 1 process procedure - add a value to the input   **/
/**                                                          **/
/**************************************************************/
28  static int
29  do_add(mtask)
30  MathTask *mtask;
31      {
32      int val = 0;

/*if a link is present, get input data by calling channel1 of link*/
33      if (mtask->task.blink)
34          val = (*mtask->task.blink->channel1)(mtask->task.blink);

/*process the data*/
35      val = val + mtask->aval;

/*return processed data*/
36      return (val);
37      }

/**************************************************************/
/**                                                          **/
/** Channel 2 process procedure - multiply input by a value  **/
/**                                                          **/
/**************************************************************/
38  static int
39  do_mul(mtask)
40  MathTask *mtask;
41      {
42      int val = 1;

/*if a link is present, get input data by calling channel2 of link*/
43      if (mtask->task.blink)
44          val = (*mtask->task.blink->channel2)(mtask->task.blink);
```

FIG.5C

```
      /*process the data */
45    val = val + mtask-mval;

/*return processed data */
46    return (val);
47    }
```

```
/******************************************************************/
/**                                                              **/
/**        end of example code                                   **/
/**                                                              **/
/******************************************************************/
```

FIG.5D

```
/***************************************************************/
/**                                                            **/
/** Listing 2) Example application - initialize a MathTask     **/
/**                                     pipeline and execute   **/
/**                                                            **/
/***************************************************************/
#include <stdio.h>

1   main( argc,argv)
2   int argc;
3   char **argv;
4     {
5     int i,n,add_value,mul_value;
6     Task *task = NULL;

/*read the length of the pipeline from command arguments*/
7     n = atoi(argv[1]);

/*initialize each task of the pipeline*/
8     for (i=1; i<=n; ++i)
9        task = initMathTask(i,i,task);

/*execute the pipeline for both channel 1 and channel 2*/
10    add_value = (*task->channel1)(task);
11    mul_value = (*task->channel2)(task);
12    printf("  #tasks: %d, channel1: %d, channel2: %d",
13           n, add_val, mul_val);
14    }

/***************************************************************/
/**                                                            **/
/**              End of example application                    **/
/**                                                            **/
/***************************************************************/
```

FIG.6

Listing 3) Example Results:

tpau:213> rrl_example 5
    #tasks: 5, channel1: 15, channel2: 120

FIG.7

PIPELINED IMAGE PROCESSING SYSTEM FOR A SINGLE APPLICATION ENVIRONMENT

BACKGROUND OF THE INVENTION

This application is a Continuation-In-Part of U.S. patent application Ser. No. 08/076,678, filed Jun. 15, 1993, now U.S. Pat. No. 5,557,795.

FIELD OF THE INVENTION

This invention relates to processing an image, comprising an image header and image data, in a single-application environment, by emulating a multi-processing environment. In particular, this invention relates to an object-oriented system employing a library of predefined objects or data structures which can be linked between a host application and a data source to create a stream-oriented data processing structure emulating a UNIX®-like pipeline data structure.

DESCRIPTION OF THE RELATED ARTS

The use of data processing pipelines in true multi-processing environments is well known. Examples of known multi-processing environments include both multiple-processor systems and high level systems where a single processor is able to support true multi-processing. The UNIX® operating system is often used in such multi-processing systems.

In such multi-processing environments, data processing pipelines are extremely useful for processing large, highly structured data blocks, such as those associated with image processing, database processing, or spreadsheet processing. Such data blocks are typically include a header and one or more lines, or sets, of data. The header indicates the type of data, its characteristics, and how many sets of data are in the data block. In such data blocks, various data processing operations must be performed on each set of data in the data blocks before the data can be used by a host application. Further, the various data processing operations are performed in a specific order.

In a multi-processing environment, data processing pipelines provide a very efficient method for processing the data blocks. In these data processing pipelines, each separate data processing operation is defined as a section of the pipeline. Each section is linked to one or both of the sections (the upstream and downstream sections) to which it is adjacent. The data processing pipeline thus forms a chain of linked pipeline sections between a data source and a host application. In a computer having a number of independent processors, each pipeline section corresponds to one of the processors. In this case, each processor works independently, and the computer operating system controls the flow of data between processors and the memory allocation. While this efficiently processes the data, the overhead necessary to control the processors and the memory consumes a significant proportion of the system's resources.

Likewise, in a computer having a single processor which can simultaneously run a number of different independent processing operations, or processes, each pipeline section corresponds to one of the independently-running processes. In this case, the operating system allocates the run-time of each process, the flow of data between each process and memory and the memory allocation. The overhead necessary to control the computer in this case consumes an even larger proportion of the system's resources, as each process and its data must be swapped into and out of the processor each time it is run. Additionally, because the processes communicate through the operating system, dynamically altering the pipeline is difficult, if not impossible.

In general, the source of data for the pipeline could include a spreadsheet providing financial information; the records within a database file providing database information; image data generated by a conventional image scanner from an original document; and a computer generated image. The host application could be a graphics program for producing pie charts, bar charts or the like from processed financial data; an inventory, accounting, or merging program which uses processed database data; or an image forming apparatus for forming an image from the processed image data.

Regardless of the particular source of data, or ultimate host application, the first, or upstream-most, section of the data processing pipeline is generally the data source for the pipeline. Alternately, the data source for this first pipeline can be a second pipeline. In this case, a special branching or "fan-out" pipeline section of the second pipeline can be used to supply data to both the first pipeline and the downstream sections of the second pipeline. In either case, the first pipeline section obtains a data element for the pipeline from the source of data and makes the data element available to the immediately downstream, or second, pipeline section. The second pipeline section receives the data element from the first pipeline section, processes the data element, and passes it downstream to the next immediately downstream or third pipeline section.

In a true multi-processing environment, the first pipeline section would obtain the next data element from the source of data and output it to the second pipeline section while the second pipeline section processes the data element received from the first pipeline section and outputs it to the third pipeline section. Accordingly, as each data element is processed by one of the pipeline sections, it is output to the next downstream section until it is output to the host application. The data can be efficiently and quickly processed in the multi-processing environment by associating one processing operation, or processor, with each section of the pipeline. This ensures that the pipeline is able to process the data block with the data through-put being limited only by the least efficient pipeline section, and the inefficiencies caused by the overhead.

In contrast, in a single-processing environment, although a variety of methods for processing large data blocks are available, each of them is inefficient compared to a multi-processing system. For example, in one method, each data processing operation is applied to every data element of a data block before any other data processing operation is applied to any data element of the data block. That is, every element of the data block must be subjected to a first data processing operation before any elements are subjected to a second data processing operation. The efficiency of the data processing operation in a single-processing environment is proportional to the efficiency of each data processing operation.

Because data elements continually move from one data processing section of a pipeline to another in a multi-processing environment, and because the data processing commands must be continuously swapped into and out of the active memory of the system, the system overhead required to manage a multi-processing system is large in comparison to the overhead requirements of a single-processing environment.

SUMMARY OF THE INVENTION

Accordingly, this invention provides a system and method for processing large data blocks by emulating a multi-processing pipeline in a single-processing environment. In the invention, a library of image processing operations is provided. Each image processing operation, or function, in the library is a class or subclass in an object-oriented system. Each section of the pipeline is an instantiated function, or task, that comprises one or more image processing functions, and sufficient data structure to self-define the state of the task.

In operation, when a host application requires processed data from a raw data source, such as image data from a scanner or an image data file, a data processing pipeline is formed between the data source and the host application. The data processing pipeline inputs the raw data from the data source, processes the data so that it is in a form the host application can use, then provides it to the host application.

The image processing pipeline is formed by calling one of the functions in the image processing library and instantiating the called function to form a first task. This first task becomes the upstream-most section of the pipeline. The upstream-most pipeline section obtains a data element to be processed from the data source. In an image processing system, the data element could be a single scanline of a raster scan of an image. The data source could be a scanner, a facsimile machine, a remote computer, a sensor, or the like, outputting a serial or parallel data signal, or a block of stored data in a memory, such as a ROM, a RAM, or a disk in a disk drive. The data element can also be directly generated by the first pipeline section itself. In this last case, the data element can be obtained from the value of an initialized variable, from the state of the first pipeline section, or the like. Once the first pipeline section is instantiated, a backward or upstream link of the host application is set to the first pipeline section.

A second pipeline section is then generally needed to process the data element obtained by the first pipeline section. Therefore, the host application creates another task by instantiating one of the functions in the library to form a second pipeline section. When this second pipeline section is created, it is automatically linked to the first pipeline section. Additionally, the link of the host application is reset to the second pipeline section. If no other image processing operations are required, the link of the host application remains between the portion of the host application which requires the processed data and the second pipeline section.

Alternately, should the pipeline require additional sections to further process the data, the host application makes additional calls to the function library to instantiate additional tasks, or pipeline sections. The newly created tasks become the third, fourth, etc. sections of the data processing pipeline. As each additional pipeline section is created, the backward link between each additional pipeline section and the immediately upstream pipeline section is formed, and the link from the host application is reset to the last instantiated task (or pipeline section).

Access to each pipeline section is controlled and maintained by the immediately downstream pipeline section (or the host application for the last pipeline section) rather than by the operating system. Thus, the overhead necessary to maintain the memory is minimal, and the overhead required to schedule the execution of the tasks is non-existant. Thus, the control system of the present invention combines the advantages of efficient processing, from the multi-processing environment, with the advantage of minimal overhead, from the single-processing environment, while avoiding the disadvantages of these environments.

A host application utilizing such a pipeline system can be run on a single-processor/single-tasking environment, a single-processor/multi-tasking environment using automatic timesharing, or in a true multi-processor/multi-tasking environment, while maintaining the advantages indicated above. Because the host application, rather than the operating system, creates, maintains, controls, and ends the pipeline, the pipeline structure is independent of the type of processor running the host application. Therefore, the host application could be one of a number of independent host applications being run on a single-processor multi-tasking system. The host application could be running a pipeline from a scanner using this pipeline system without using the operating system to schedule the pipeline or allocate, maintain, and deallocate memory for the pipeline. Thus, the overhead disadvantages normally associated with running a pipeline using the operating system can be avoided.

In a first embodiment of the invention, a header data channel is used to facilitate the data processing operation. In this embodiment, to begin processing a data block, the host application requests the header of the data block from the last section of the pipeline. Each section of the pipeline, in turn requests the header from the upstream pipeline section to which it is linked. This is done by making a procedure call from the downstream pipeline section to invoke the upstream pipeline section. This is analogous to pushing the downstream pipeline section onto a stack. As the header is requested from each upstream pipeline section, the processor stops processing the downstream pipeline section and begins processing the upstream pipeline section.

When the request reaches the first pipeline section, the first pipeline section obtains or generates the header of the data block and returns it to the second pipeline section through the header data channel. Once the first pipeline section returns the header, the CPU ceases running the first pipeline section and begins running the second pipeline section. This is analogous to popping the downstream pipeline section off the stack. Each of the sections of the pipeline process the header data to indicate what the section will do to the lines of data in the data block. Each section returns the processed header data to the next downstream pipeline section through the header data channel. After the last pipeline section processes the header, the last pipeline section returns the fully processed header data to the host application.

Once the processed header data is received by the host application the host application will know how many lines of data are in the data block. The host application will request the first line from the most downstream pipeline section. Each intermediate pipeline section will request a line of data from the immediately upstream pipeline section to which it is linked, until the request reaches the first pipeline section. The first pipeline section will obtain the first line of data from a data source or generate a line of data, then provide the data to the immediately downstream section. Each intermediate section will process the data received from an upstream section, then pass the processed data to an immediately downstream section, until the processed data is provided to the host application.

The above-outlined process is repeated until all the lines of data that make up a data block have been processed and received by the host application. The efficiency of the image processing pipeline thus depends only on the least efficient section of the pipeline.

In a second embodiment of the invention, a header data processing channel is not used, and the header data is initially processed during instantiation of the data processing pipeline. In this embodiment, when the host application instantiates the first pipeline section, the first section immediately obtains or generates header data descriptive of the data block to be processed by the pipeline. When the second pipeline section is instantiated, the second pipeline section immediately obtains the header data from the first pipeline section, and processes the header data to reflect the data processing operation that will be performed by the second section. Each of the instantiated pipeline sections, in turn, will obtain and process the header upon instantiation. When the pipeline is complete the host application will already have the processed header data, and the host application can immediately call for the first line of data from the data block.

Other objects and advantages, together with the full understanding of the invention, will be apparent and appreciated in reference to the following description and claims taken in conjunction with the accompanying drawings.

BRIEF DESCRIPTION OF THE DRAWINGS

This invention will be described relative to the following drawings, in which like reference numbers refer to like elements, and wherein:

FIGS. 5A, 5B, 5C and 5D show an exemplary code listing for a sample task;

FIG. 6 shows a code listing for an exemplary host application which calls the tasks from the library to form the pipelines;

FIG. 7 shows a listing of the outputs of the pipelines shown in FIG. 4 and listed in FIGS. 5A, 5B, 5C, 5D and 6;

DETAILED DESCRIPTION OF THE PREFERRED EMBODIMENTS

Figure 1:
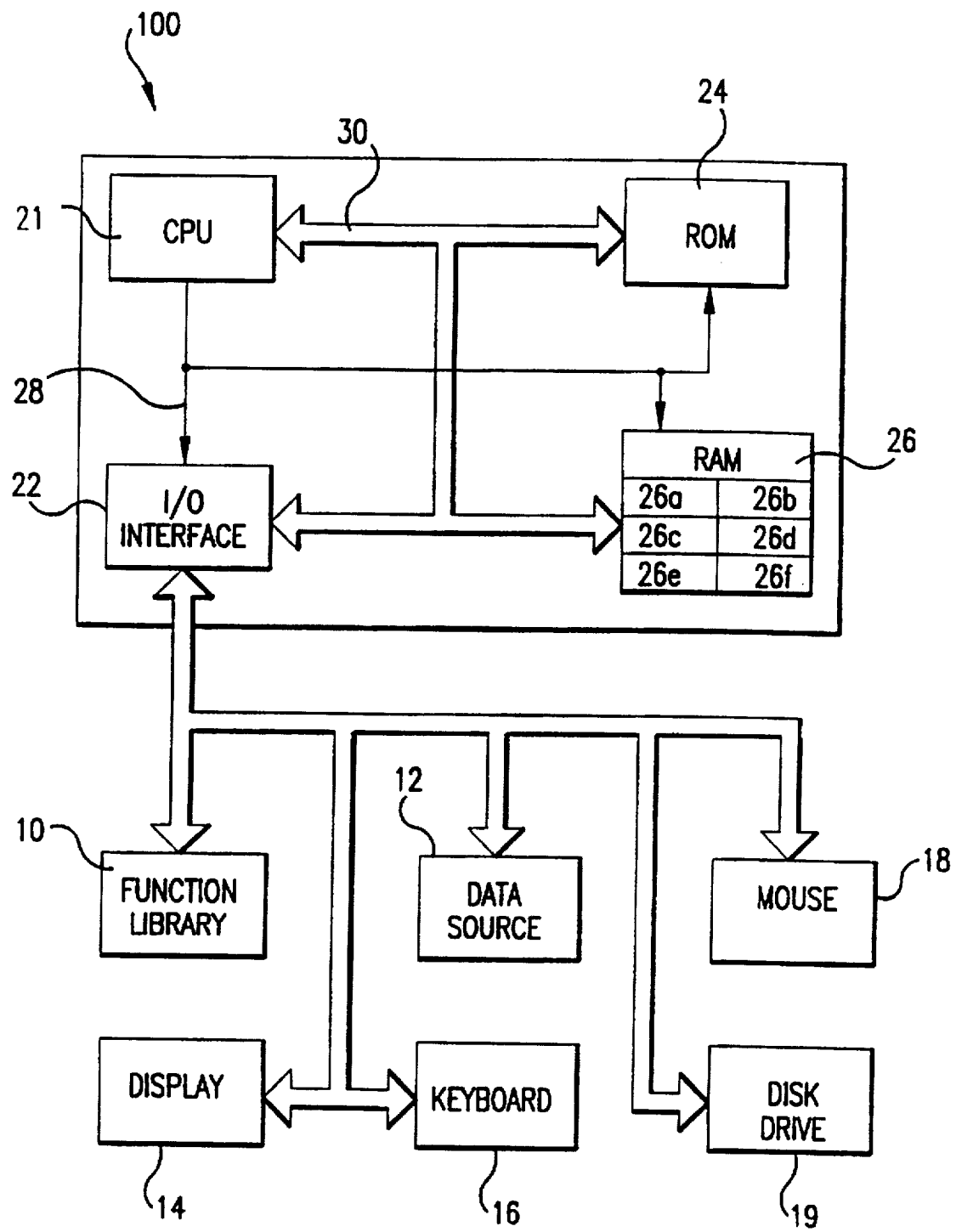
FIG. 1 shows a block diagram of the system of this invention.

As shown in FIG. 1, a computer 100 has a single-processing controller (CPU) 21. The computer 100 also has an input/output interface (I/O interface) 22, a ROM 24, and a RAM 26. The CPU 21 sends control signals to the I/O interface 22, ROM 24, and RAM 26 through control lines 28, and sends and receives data from the I/O interface, ROM 24, RAM 26 through a data bus 30. A function library 10, a data source 12, a display 14, a keyboard 16, a mouse 18, and a disk drive 19 are connected to the CPU 21 through the I/O interface 22. The mouse 18 represents any secondary pointing device, such as a mouse, a trackball, a light pen, a touchscreen, a touchpad or the like. The disk drive 19 represents any non-volatile storage device, such as an analog or digital magnetic or optical tape, a hard drive, a hard card, a floppy disk and floppy disk drive, a CD-ROM and CD-ROM disk drive, a flash memory or the like.

The CPU 21 is a single-processing processor. That is, the CPU is able to actively process data for one application at a time, and is able to run and perform only a single data processing operation at any one time. The I/O interface 22 connects the CPU 21 through either a serial data port (not shown) or a parallel data port (not shown) to serial or parallel data input sources or data output sources. These sources of data include the disk drive 19 and the mouse 18, as well as the keyboard 16 and the data source 12. The data source 12, as noted above, could include a scanner, a facsimile machine, a remote computer, a sensor or the like. The I/O interface 22 also comprises the hardware necessary for driving the display 14 and for inputting signals from the keyboard 16, the mouse 18 and the disk drive 19.

The ROM 24 stores all the basic operating programs for the CPU 21, including bootstrap programs and the like. The RAM 26 comprises a large number of randomly accessible memory locations. The RAM 26 can be divided into blocks of allocatable memory, such as blocks 26a, 26b, 26c, 26d, 26e and 26f. The blocks of allocatable memory 26a–26f can store a host application and one or more instantiations of the data processing functions comprising the data processing tasks, (i.e., the sections of the data processing pipeline). The display 14 outputs visual information, while the keyboard 16 is used to input information to the computer 100.

The function library 10 stores a library of uninitialized data processing structures, or objects, which form the data processing functions called by the CPU 21. While the function library 10 is shown as an independent element accessed through the I/O interface 22, it is understood that the function library 10 can be stored in the ROM 24 or on a nonvolatile memory device accessed through the disk drive 19. Further, newly written data processing functions which have not yet been stored to the non-volatile memory device in the disk drive 19 or to the function library 10 can be stored in the RAM 26.

Likewise, the data source 12 is shown as being external to the computer 100 and accessed through the I/O interface 22. However, it is understood that the data source 12 can be data stored in the ROM 24, the RAM 26, on the non-volatile memory device in the disk drive 19, or within a register counter or internal memory of the CPU 21. The data source 12 can also comprise data input through the keyboard 16. Finally, as noted above, the first pipeline section can generate the data elements itself, rather than obtaining them from some external source.

Figure 15:
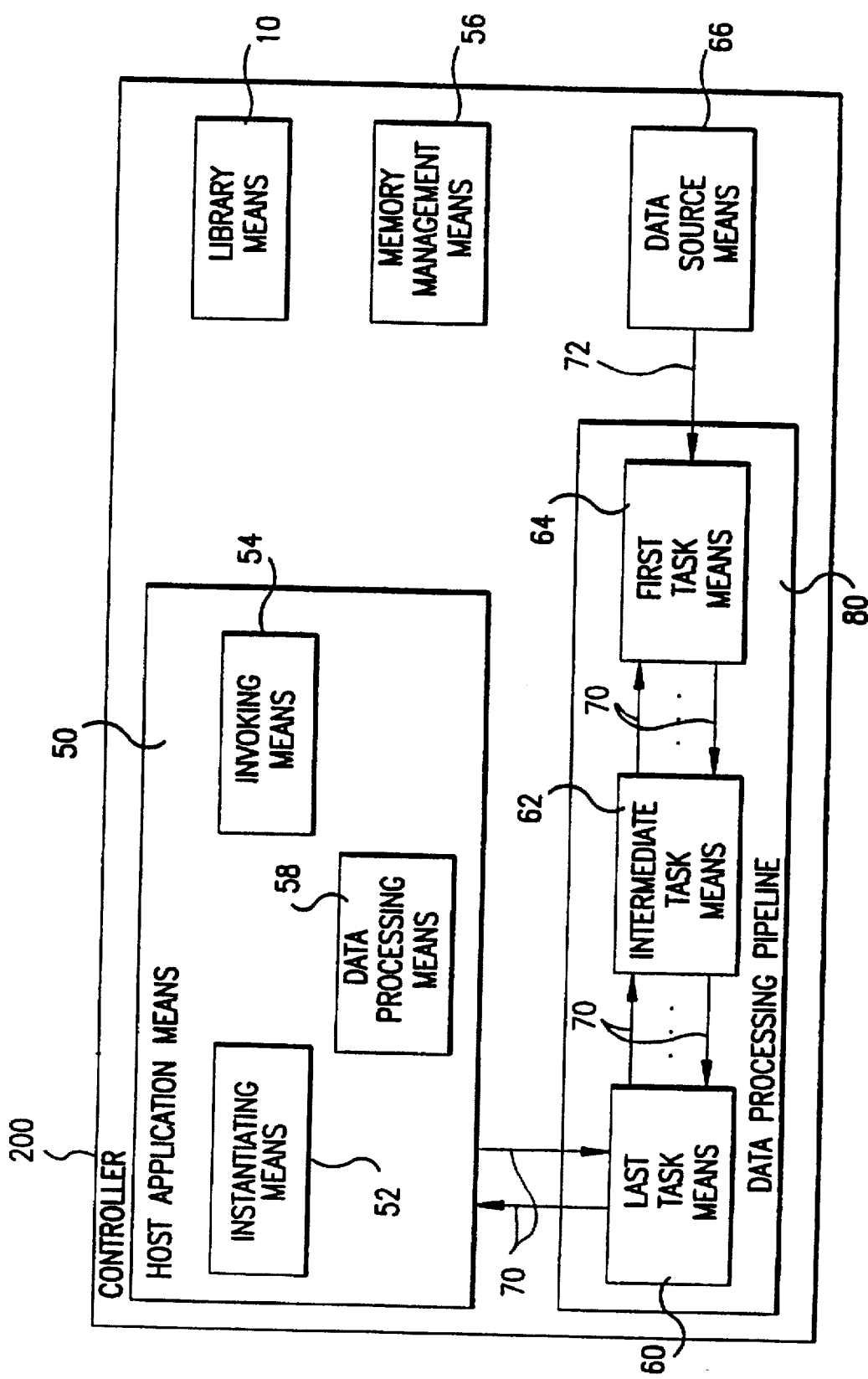
FIG. 15 shows a block diagram of a data processing system of this invention.

As shown in FIG. 15, a data processing system 200 according to this invention comprises a host application means 50, a library means 10, a memory management means 56 and a data processing pipeline 80. The data processing pipeline 80 includes, a last task means 60 which is connected to the host application means 50, at least one intermediate task means 62 and a first task means 64. The data processing system 200 may also include a data source means 66. However, the data processing system 200 need not include the data source means 66. In this case, the first task means 64 also performs the function of the data source means 66. A plurality of links 70 connect the first task means 64, the at least one intermediate task means 60, and the last task means 62. Of course, it should be understood that simple pipelines 80 may include only the first task means 64 and the last task means 60. A data input link 72 connects the data source means 66 to the first task means 64.

The host application means 50 includes a data processing means 58 for further processing data received from the data processing pipeline 80. Initially, the data processing system 200 includes only the host application means 50, the library means 10, and the memory management means 56. The host application means 50 operates a processor according to instructions contained within the host application means 50. The processor can be a single processor operating in a single-tasking environment, a single processor operating in a multi-tasking environment, or a multi-processor computer operation in a multi-tasking environment. In any case, the host application means 50 runs as if it were in a single-tasking environment.

When the host application means 50 determines that it needs processed data from the data source 66, it creates and invokes the data processing pipeline 80. The host application means 50 thus includes an instantiating means 52 and an invoking means 54.

To create the pipeline 80, the instantiating means 52 accesses the library means 10 to obtain one of the uninitialized functions, and creates an instantiated function or task that is stored in a block of memory. The instantiated function, or task, is linked to the host application means 50 or another previously created task. If the task is linked to the host application means, it is the last task 60. If the task is linked to another task, and another task is linked to it, it is an intermediate task 62. If the task is linked to another task, and obtains data from the data source means 66, or generates data itself, it is the first task 64.

In instantiating a function to create a task, the instantiating means 52 works with the memory management means 56 to allocate one of the memory blocks 26a–26f of the memory 26 for storage of the task. After all of the desired tasks are instantiated, the invoking means 54 invokes the pipeline 80 by requesting data from the last task means 60. The request from the invoking means 54 ripples in an upstream direction of the pipeline 80 towards the first task means 64. When the request reaches the first task means 64, the first task means obtains data from the data source 66, or generates the data itself. Then, the first task means 64 returns the data in the downstream direction to the intermediate task means 62. The intermediate task means 62 processes the data, and returns the processed data to the last task means 60. The last task means 60 processes the data received from the intermediate task means, and returns its processed data to the host application means 50. Then, if more data is needed by the host application means 50, the invoking means 54 again invokes the pipeline 80.

Once the host application 50 has all of the desired data, the invoking means 54 again invokes the pipeline 80 to shut it down and to clean-up any errors arising from operation of the pipeline 80. The invoking means 54 requests error codes from the pipeline. The request ripples upstream as before. Each task means determines if it generated any error codes and returns them. Once the error codes are returned, the invoking means 54 signals the memory management means 56 to release the memory allocated to the task means 60–64 of the pipeline 80.

Figure 16:
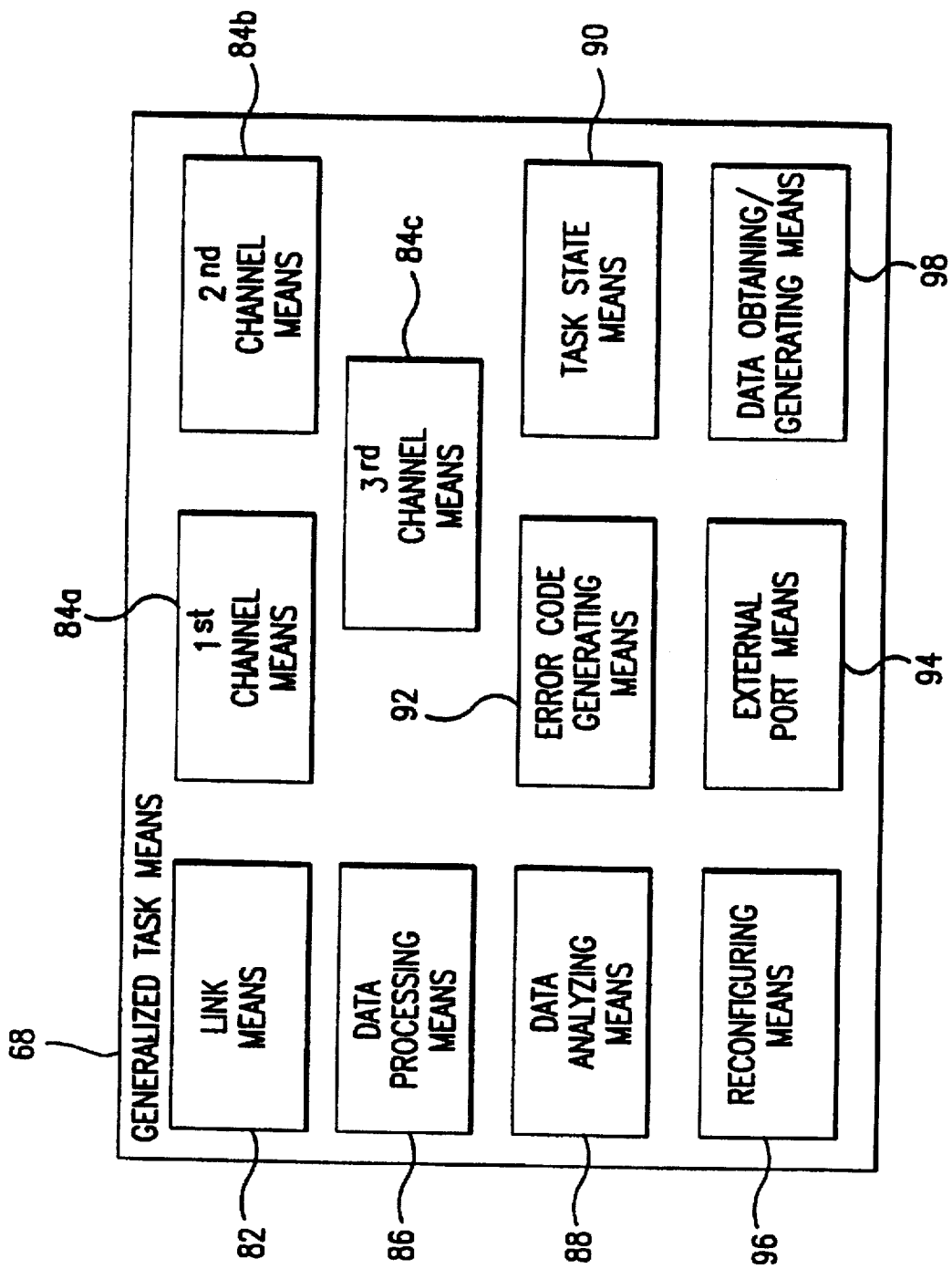
FIG. 16 shows a block diagram of a generalized task of this invention.

FIG. 16 shows a generalized task means 68, which represents any of the task means 60–64. The generalized task means 68 comprises a link means 82, at least one channel means 84a–84c, a data processing means 86, a data analyzing means 88, a task state means 90, an error code generating means 92, an external port means 94 and a reconfiguring means 96. Of course, it should be understood that the actual tasks means 60–64 may have different combinations of these elements, lacking one or more of them. Further, the first task means 64 may also include a data obtaining/generating means 98 for obtaining or generating data for the pipeline 80.

The link means 82 links the generalized task means 68 to a next or upstream task means 68 when a backward link is used, or a previous or downstream task means 68 when a forward link is used. Of course both links can be used at once. The generalized task means 68 receives data returned from an upstream task means through one or more of the channel means 84a–84c. The data is then processed using the data processing means 86 before it is provided to a downstream task means through the corresponding channel means 84a–84c.

The task state means 90 maintains the state of the task means 68. The task state means 90 also controls all of the other means of the generalized task means 68. The data analyzing means 88 determines if the data received from the next upstream task means is suitable for the data processing means 86. If the data is not suitable, the data analyzing means 88 has two alternate possible responses. In a first type of response, a simplified task means 68 simply returns an error code generated by an error code generating means 92, instead of the data, to a downstream task means. When the host application means 50 receives the error code instead of data, the application means 50 uses an error handling system to determine the nature (and cause) of the error. The host application means 50 can then gracefully exit, or attempt to recover from the error by reconfiguring and/or reinitializing the pipeline 80.

In a second type of response, a complex task means 68 includes a reconfiguring means 96, which attempts to dynamically reconfigure the pipeline 80 to recover from the error. The reconfiguring means 96 does this by dynamically instantiating additional task means from the library means 10 and inserting the additional task means into the pipeline 80. The reconfiguring means 96 does this by accessing one or more of the other task means through their external port means 94. The external port means 94 permits a variety of access modes to the other task means 68. These modes include examining and/or altering the task state means 90, examining the error code generating means 92, altering the link means 82, or the like of the other task means, or of itself.

Of course, even if the task means 68 has a sophisticated reconfiguring means 96, unrecoverable or hard errors may still occur. In this case the task means again uses the error code generating means 92 to generate an error code that is provided to the next downstream task means.

Finally, in a second embodiment, the link means 82 can link, instead of the generalized task means 68 itself, the individual channel means 84a–84c of task means 68. That is, the link means 82 can link one of the channel means 84a–84c directly to a corresponding channel means 84a–84c of any other task means. Therefore, if a task means 68 has a number of channel means 84a, 84b, 84c, each channel means 84a–84c can be linked to a different upstream or downstream task means. In contrast, in the first embodiment, because the link means 82 linked the task means 68, all of the channels 84a–84c of the task means 68 would be linked to the same next upstream/downstream task means 68.

Figure 2:
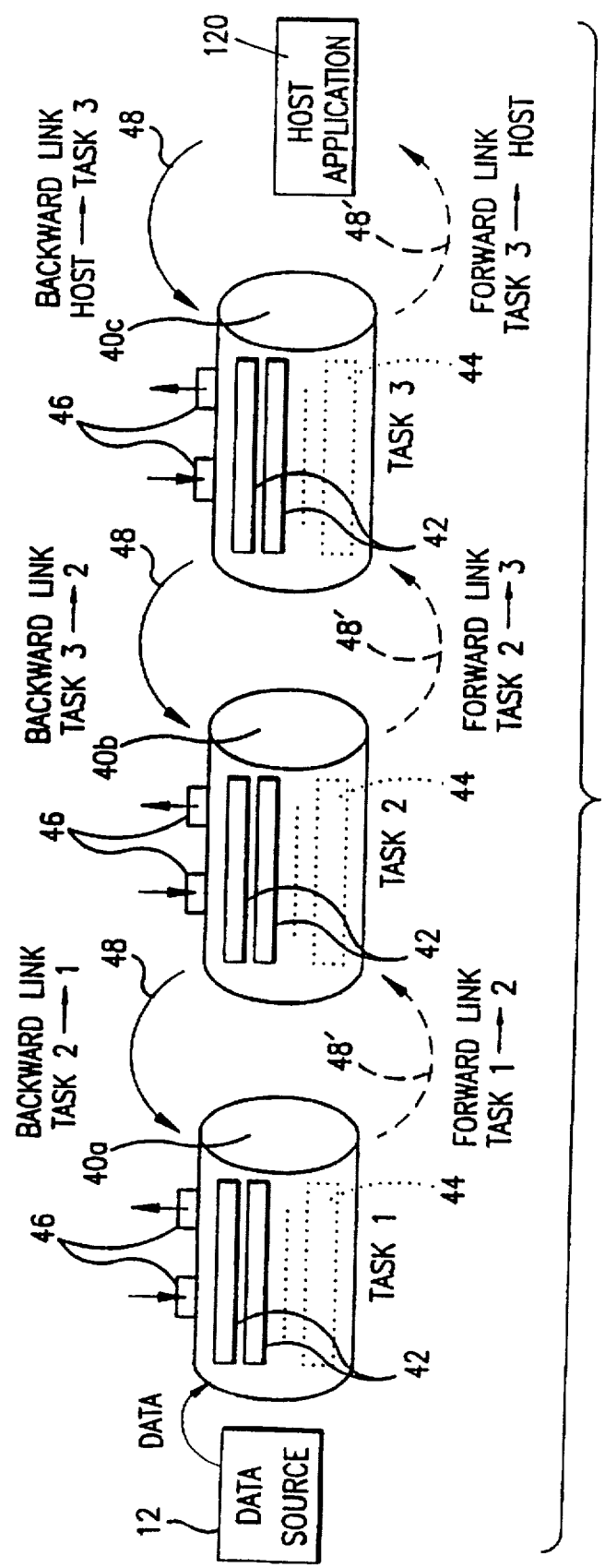
FIG. 2 shows a block diagram of a pipeline of this invention.

As shown in FIG. 2, each instantiated function, or task, can be visualized as a section 40a, 40b and 40c of the pipeline 40 running between the data source 12 and a host application 120 running on the computer 100. The host application 120 is the application currently being run by the CPU 21 (and stored in the RAM 26). Each section 40a, 40b and 40c of the pipeline 40 comprises one or more data processing channels 42, a data structure 44 defining the state of the pipeline section, and zero, one or more external ports 46. Each pipeline section 40b and 40c, and the host application 120, also comprises a backward link 48 which links the pipeline section 40b, 40c or the host application 120 to the the next upstream pipeline sections 40a, 40b and 40c, respectively. Alternately, each pipeline section 40a, 40b and 40c has a forward link 48' to the immediately downstream pipeline section 40b and 40c or the host application 120. Finally, both the backward links 48 and the forward links 48' can be provided in a pipeline.

In a preferred embodiment of the data processing system, the pipeline comprises "intelligent" pipeline sections. These intelligent pipeline sections are able to dynamically reconfigure the pipeline as it is operated from the host application, without needing any intervention by the host application.

For example, the intermediate pipeline section 40b is able to determine if it is able to process the data element returned by the first pipeline section 40a. If the intermediate pipeline section 40b is not able to process the data element, the intermediate pipeline section 40b dynamically calls the function library 10, and instantiates a new pipeline section 40d. The new pipeline section 40d is linked to the first pipeline section 40a. The pipeline section 40b then alters its own link, to point to the new pipeline section 40d, rather than the first pipeline section 40a.

Alternately, if the intermediate pipeline section 40b determines that it will never be able to process the data, (even if it were to reconfigure the pipeline), then it returns an error code indicating the hard error to the last downstream pipeline section 40c. The last downstream section 40c provides the error code to the host application 120. An error handling system in the host application 120 determines, from an error code library, the nature of the error. In one embodiment, the host application 120 will determine if it can reconfigure or reinitialize the pipeline to recover from the error. If so, it will reconfigure or reinitialize the pipeline. However, if the host application is not able to recover from the error, or is not provided with this capability, the host application will gracefully exit.

Such a non-recoverable error can occur, for example, in processing an image. If the header indicated that there are 1000 scanlines in an image, but no scanline image data element was returned on the 998th call to the first pipeline section, the system will encounter a hard error. This error cannot be recovered from, regardless of the ability of the pipeline to reconfigure itself, as there is simply no data to process. In this case, the first pipeline section will return an "ERR" error code. The host application will then use the error handling system to determine the reason for the error code. After determining the nature of this error, the host application will gracefully exit, as any reconfiguring or re-initializing of the system is pointless.

If the pipeline is reconfigured, then the intermediate pipeline section 40b requests data from the new pipeline section 40d. The new pipeline section 40d requests data from the first pipeline section 40a, which provides the obtained data element to the new pipeline section 40d. Alternately, the intermediate pipeline section 40b, when calling the function library 10, can provide the data element it received from the first pipeline section 40a to the intermediate pipeline section 40d, so that the new pipeline section 40d has the data element as soon as it is created. Then, when the intermediate pipeline section 40b requests data from the new pipeline section 40d, the new pipeline section 40d can immediately process and return the data element.

Further, if the forward link 48' is provided, each intelligent pipeline section can include, in its data structure, means for determining if the data element needs to be processed by the pipeline section. If not, the pipeline section can dynamically reconfigure the pipeline, without any involvement by the host application, to remove itself from the pipeline. The intelligent pipeline section causes the downstream task to which it is linked to alter its backward link so that the downstream task is linked to the task upstream of the intelligent pipeline section. This "short circuits" the intelligent pipeline section out of the pipeline. The forward link is necessary, so that the intelligent pipeline section knows which downstream pipeline section to alter, so that the downstream pipeline section is linked to the proper upstream pipeline section.

The external ports 46 are used to examine the current state of a pipeline section, to write data to the data structure 44 of a pipeline section, to change that pipeline section's current state, or to dynamically alter the linkage 48 of the pipeline section(s) to dynamically add sections or delete sections from the pipeline 40. In general, the external ports 46 are used to control the pipeline 40, independently of the data channels 42, which only process the data elements. That is, the data channels 42 are used solely to process the data received from an upstream pipeline section and to output the processed data to a downstream pipeline section. The external ports 46 allow access to the data structure 44 of a pipeline section without affecting the operation of the data channels 42.

Thus, in an alternate embodiment, if it becomes necessary, for example, after the pipeline 40 is created, to add the new pipeline section 40d between the first pipeline section 40a and the intermediate pipeline section 40b, this is accomplished using the external ports 46. In this example, the last pipeline section 40c has, as a part of its data structure, a structure for testing the data in the channels. If the form of the data received at the last pipeline section 40c is incompatible with the form necessary for the proper operation of the last pipeline section 40c, but the data must be altered before the intermediate pipeline section 40b processes the data, the last pipeline section 40c dynamically instantiates the new pipeline section 40d and inserts it between the first and intermediate pipeline sections 40a and 40b. The last pipeline section 40c does this by accessing the data structure 44 of the intermediate pipeline section 40b through the external port 46 of the intermediate pipeline section 40b. The last pipeline section 40c alters the link 48 of the intermediate pipeline section 40b, to change the link 48 from the first pipeline section 40a, to the new pipeline section 40d. Likewise, the data structure 44 of the new pipeline section 40d is accessed to ensure it is properly initialized and linked to the first pipeline section 40a.

In operation, when a host application 120, such as the application shown in FIG. 6, requires data from the data source 12, the host application first forms the pipeline 40 by calling and instantiating functions from the function library 10. In the example shown in FIG. 6, the variables "i", "n", "add_value", and "mul_value" are initialized in line 5 of the host application. In line 6, the first task 40a is defined as a "null" task. While the first task can be connected to obtain data elements from the data source 12, it is possible to indicate, using the "null" command, that the first task 40a also serves as the data source 12. In line 7 of FIG. 6, the number of tasks in the pipeline 40 is determined by the command line, shown in FIG. 7, which is initiated by the host application. In general, the length and constituents of the pipeline 40 will be dynamically determined as the host application runs. Alternately, the length and constituents of the pipeline 40 are expressly set forth in the host application. Finally, even when the initial length and constituents of the pipeline 40 are either dynamically determined or expressly set forth, the pipeline 40 can dynamically reconfigure itself depending upon the data received from the data source 12.

In the example shown in FIG. 6, as shown in line 7, the length of the pipeline 40 is expressly set forth in the command line initiating the program. In this case, the length of the pipeline is 5, as shown in FIG. 7. As shown in lines 8 and 9 of FIG. 6, each function is called and initialized, extending from the data source to the host application. In this case, as shown in line 6 of FIG. 6, the first task 40a also acts as the data source. Further, as indicated in line 9, each task in the pipeline 40 is a different instantiation or task of the same function. As indicated in line 9 of FIG. 6 and line 17 of FIG. 5A, when the function in this example "MathTask" is initialized, its data structure contains two channel data buffers, each set to the current value of "i", and a pointer pointing to the upstream task in the pipeline. Additionally, if there is no upstream task in the pipeline, the pointer is set to "null".

As the functions in the function library 10 are defined as objects in an object-oriented language, each time a function is instantiated in the example shown in FIG. 6, it is in fact a different instantiation of the same function. Thus, a single pipeline 40 may have multiple copies of any single function. Each copy of the function is thus a different instantiation of the base function stored in the library, and acts as a different task or section of the pipeline 40. Thus, the functions in the function library 10 are recursive, as they can be used more than once in any single pipeline.

After each task in the pipeline is created, in lines 8 and 9, the channels of the initialized tasks, in this case two, are executed in lines 10 and 11. Once the host application shown in FIG. 6 receives the final data from the tasks through the channels executed in lines 10 and 11, the output shown in FIG. 7 is printed, as set forth in lines 12 and 13 of FIG. 6.

As indicated above, in lines 8 and 9, in the host application of FIG. 6, the pipeline comprises a number of independent instantiations of the function "MathTask". FIGS. 5A–5D show the library object "MathTask" which is called by the host application in lines 8 and 9 of FIG. 6, to form each instantiation necessary for the pipeline formed by the host application, as shown in FIG. 6.

In lines 1–6 of the "MathTask" function shown in FIG. 5A, the primary data structure is defined. As shown in lines 1–6, the data structure includes two channels, channel 1 and channel 2, and a backward or upstream link. Next, in lines 7–12, the data structure particular to this function, "aval" and "mval", for the first and second channels, respectively, are defined.

Next, in line 17, the instantiation procedure for the task "MathTask" is defined, with the data requests "avalue" for channel 1 and "mvalue" for channel 2 and the upstream link "link". In lines 18–20, the variables "avalue" and "mvalue", for channel 1 and channel 2, respectively, and the link are defined. Finally, in line 21, the procedure for creating a task of the function "MathTask" and for allocating a memory block of the RAM 26 is defined, as shown in FIG. 5B.

Next, as shown in lines 28–37 of FIG. 5C, the data processing procedure and data structure associated with channel 1 is defined. The channel 1 data processing procedure obtains a number from the immediately upstream task. Additionally, as indicated in line 6 of FIG. 6, the first task in the pipeline is a "null" task. The result arising from the "null" status for the first task is defined in line 32, which defines the initial value of "val" as zero. In line 33, if a backward link exists, the value "val" is set, in line 34, to the channel 1 output of the upstream task. Then, in line 35, the value "val" is updated by adding the channel 1 addend "aval" of the current pipeline section to it. The channel 1 addend value "aval" for each pipeline section was set in line 25 to the state parameter "avalue" of the pipeline section, which was set in line 9 of FIG. 6. Finally, the channel 1 data processing procedure ends by returning the new value "val" to the immediately downstream pipeline section.

Similarly, in lines 38–47 of FIGS. 5C–5D, the channel 2 data processing procedure is defined. The only differences occur in line 39, which uses the channel 2 procedure initialized in line 23 of FIG. 5B rather than the channel 1 processing procedure initialized in line 22 of FIG. 5B. Further, in line 42 the value "val" is preset to one to account for a "null" data source for first pipeline section. In line 45 the new value "val" is equal to the old value "val" multiplied by the channel 2 multiplicand, which was set to the state parameter "mvalue" in line 26 of FIG. 5B, which was set in line 9 of FIG. 6.

Figure 4:
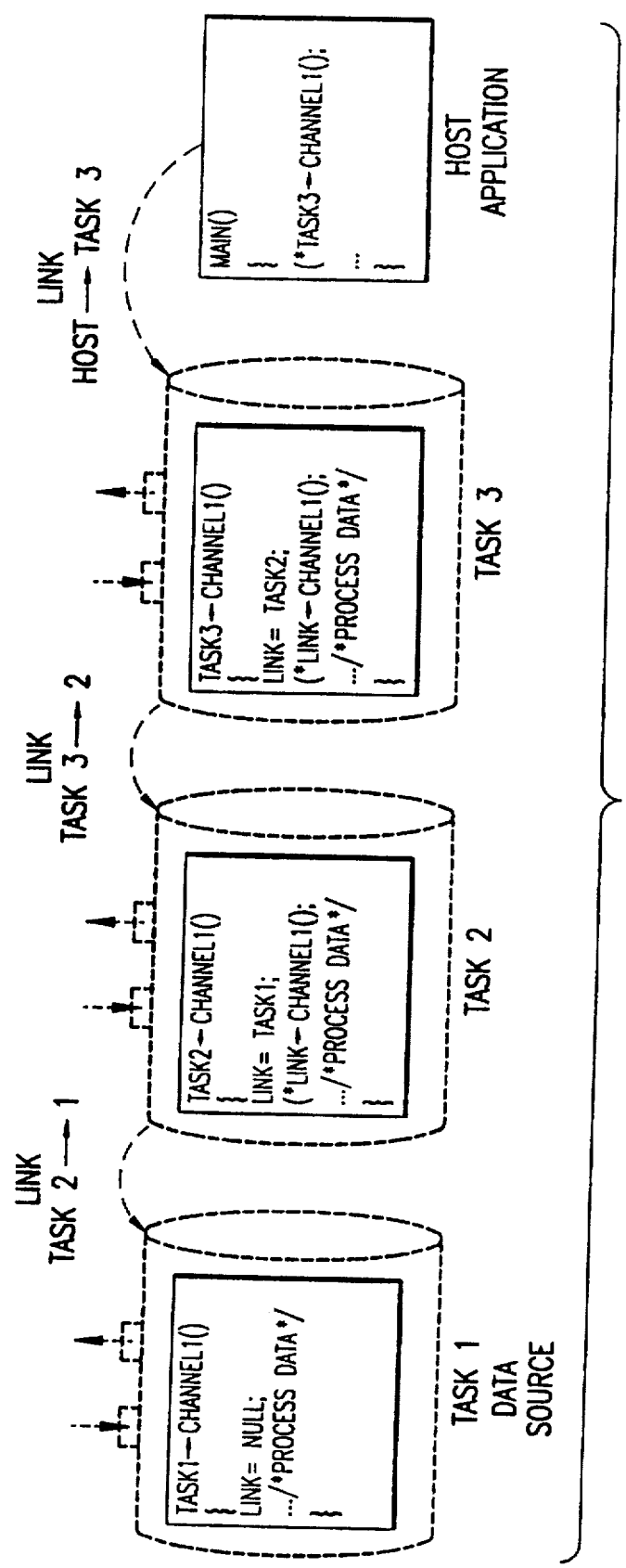
FIG. 4 shows a diagram of a linked pipeline for an exemplary data processing program.

In operation, the host application, shown in FIG. 6 in lines 8 and 9, calls the function "MathTask" an indicated number of times. The first instantiation of the function "MathTask" is set up as a null task, unconnected to a data source. By looping again through lines 8 and 9, a second instantiation of the function "MathTask" is formed with a backward link to the previous instantiation of the task "MathTask". Thereafter, for each loop through lines 8 and 9 of FIG. 6, a further instantiation of the function "MathTask" is formed. Once the last loop through lines 8 and 9 of the host application shown in FIG. 6 is completed, the backward link from the host application to the last one of the tasks "MathTask" remains set. FIG. 4 shows a three-section pipeline initialized in this manner.

Figure 3:
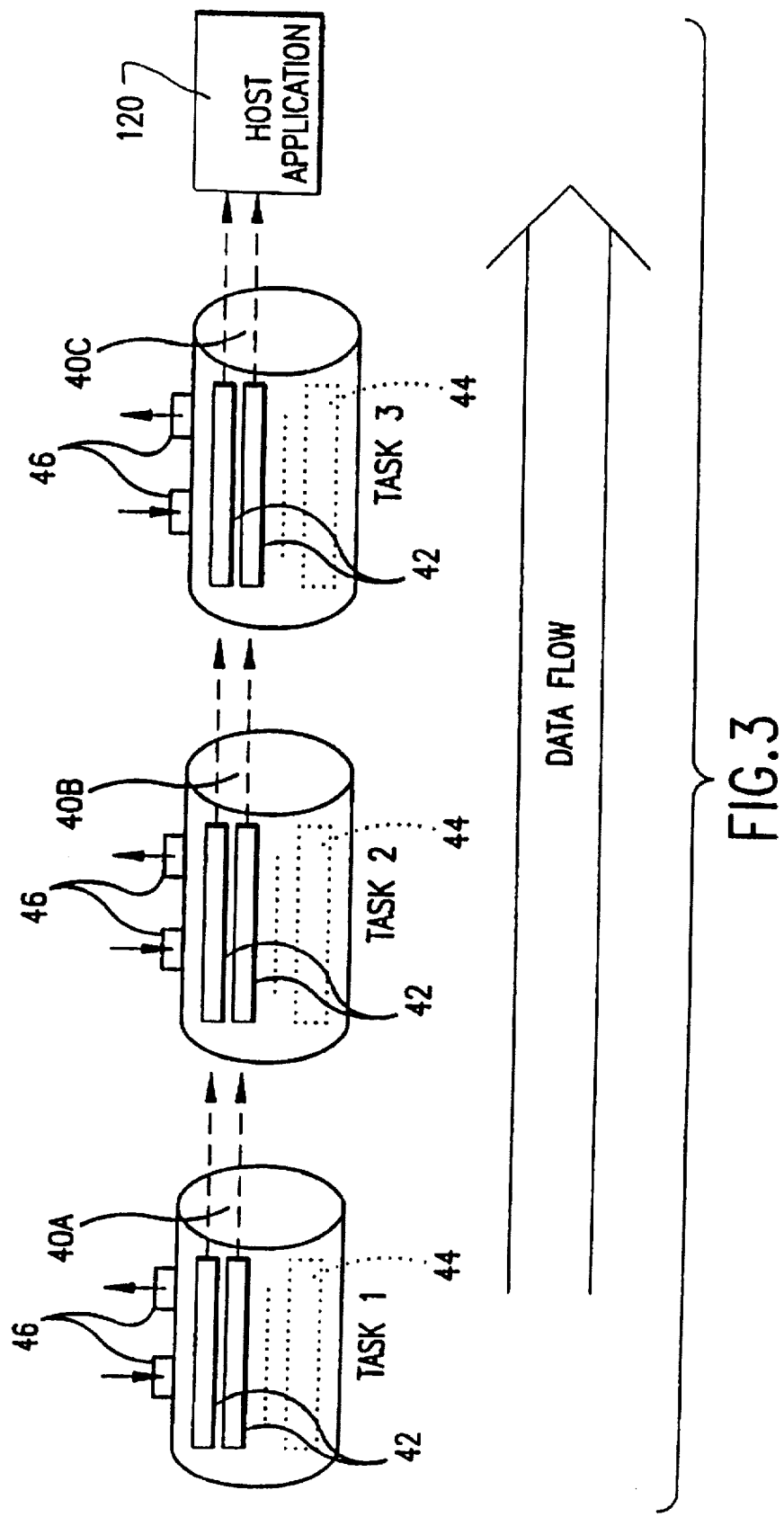
FIG. 3 shows a block diagram of a flow of data in the pipeline of this invention.

Then, in lines 10 and 11, the host application requests data from channel 1 and channel 2 of the last instantiation of the function "MathTask". The last task requests data from the task immediately upstream of it. This continues until the first instantiation of the "MathTask" receives a request for data through channel 1 and channel 2. FIG. 3 shows an example of this type of data flow. After the host application invokes the pipeline in lines 10 and 11 of FIG. 6, the last pipeline section invokes each channel, in lines 34 and 44 of FIG. 5C of the pipeline section to which it is linked. Then, in turn, each invoked pipeline section invokes the upstream pipeline section to which it is linked. When the first pipeline section is reached, it obtains the data element from the data source 12, or, in this case, self-generates the data element. The first pipeline section then returns the data element to the pipeline section which called it, as described above.

The first instantiation of the function "MathTask" then performs the data processing procedures defined for channel 1 and channel 2. The first instantiation returns a value of 1, equal to 0+1, for channel 1 and a value of 1, equal to 1×1, for channel 2, to the second instantiation of the function "MathTask". In turn, each instantiation of the function "MathTask" adds a first number to the value held in channel 1 and multiplies the number held in channel 2 by a second number. In the example shown in FIGS. 5A–5D, the first and second numbers are the addend and the multiplicand initialized when the pipeline was created in line 9 of FIG. 6. However, the numbers could have been generated dynamically. Accordingly, the processed data in channels 1 and 2 ripples downstream towards the host application. Eventually, the downstream-most instantiation of the function "MathTask" provides the requested data to the host application.

When the CPU 21 runs the host application shown in FIG. 6, it stores the host application in memory block 26a of RAM 26. The host application is actually a data structure stored in the allocatable memory block 26a. The data structure itself comprises a template over the designated memory locations, the template defining the flow of control operations of the CPU 21. In a first section of the allocated memory block 26a, various memory locations are defined and/or allocated as variables. The data block 26a also contains various memory locations defining the state of the host application, and various memory locations acting as buffers for storing data requested by the host application or data being processed by the host application.

Similarly, when the host application calls the function library 10 to instantiate, for example, an instantiation of the function "MathTask", another data block 26b is allocated to that task or pipeline section. Like the host application, the pipeline section is actually a data structure in the allocated memory block 26b comprising a template over the allocated memory block 26b. The allocated memory block includes buffers for storing data being processed, various memory locations for defining types of data, procedure pointers indicating from where this task receives its data, various memory locations storing data defining the state of the task, and one or more data buffers for storing the processed data received from an immediately upstream pipeline section.

The allocated memory block 26b also includes the data structures defining the data processing operations for channels 1 and 2. The data structure in the allocated memory block 26b may alternately include look up tables for performing the data processing, or a pointer to other functions in the function library 10. In general, each task, as it is instantiated and allocated to one of the memory blocks 26a–26f, automatically allocates buffers sufficient for the data inputs, data outputs, task state and various data processing procedures performed by the task.

Figure 8:
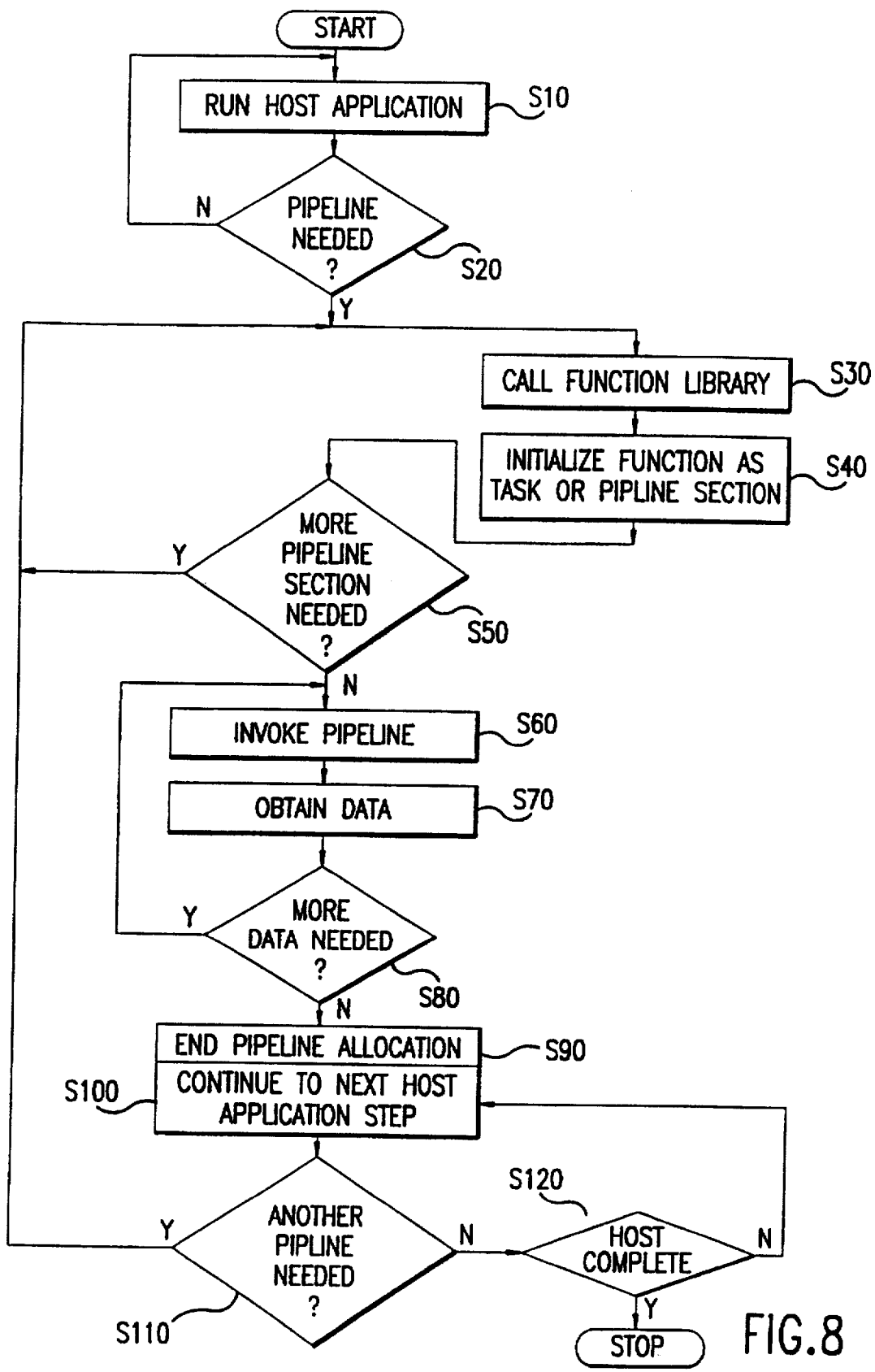
FIG. 8 is a flow chart of a routine for practicing the invention.
Figure 9:
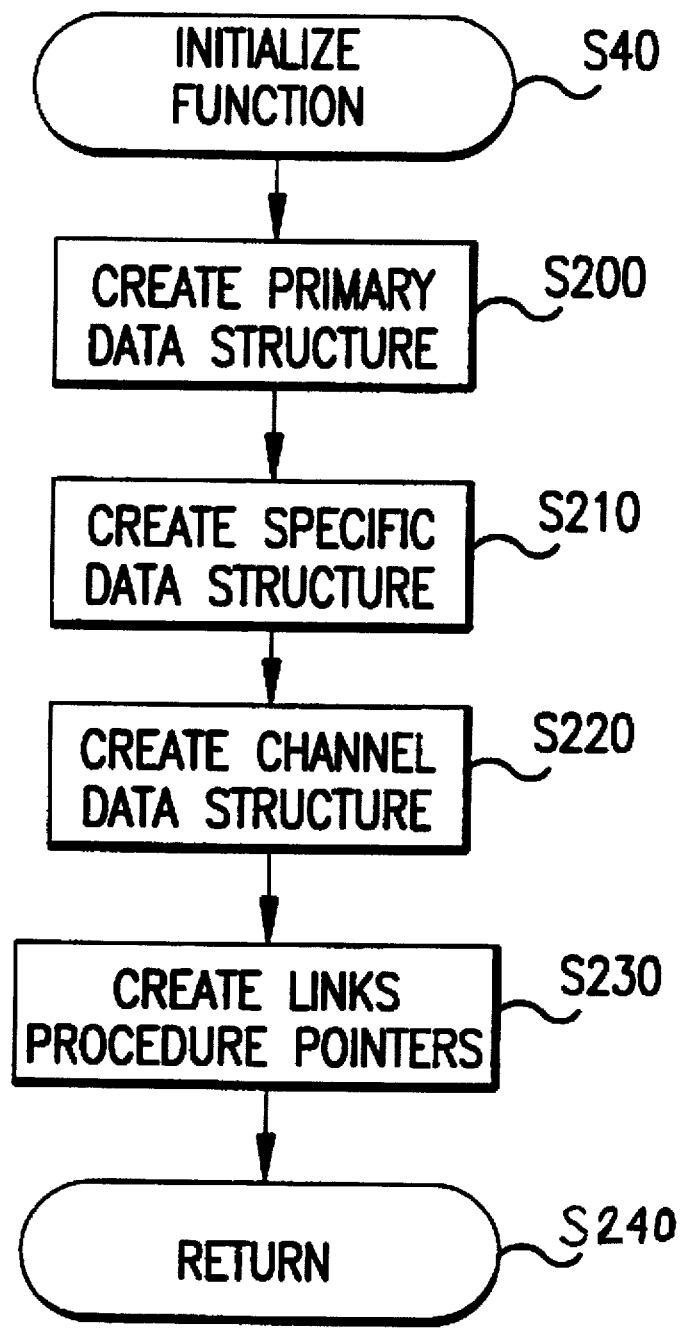
FIG. 9 is a flow chart of a function initialization routine.
Figure 10:
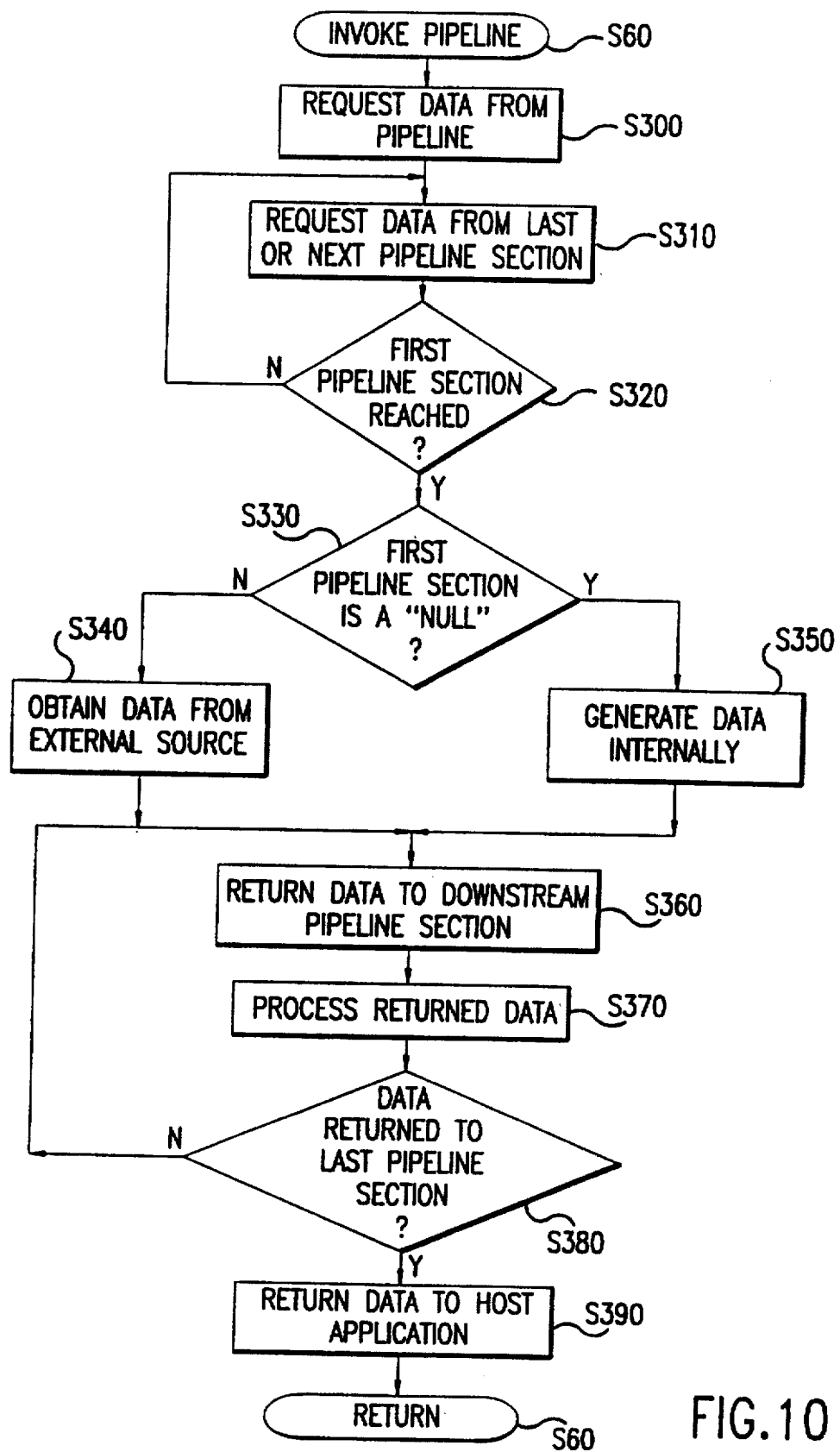
FIG. 10 is a flow chart of an invoking and processing routine.

FIGS. 8–10 show generalized flow charts for the control routine implementing this method. As shown in FIG. 8, after starting, the host application 120 is run by the single processing CPU 21 in step S10. In step S20, the controller 21 checks to see if a data processing pipeline is needed in the current operation of the computer 100. If not, the control routine returns to step S10.

However, if a pipeline is needed, the control routine continues to step S30, which calls a function from the function library. Then, in step S40, the called function is instantiated to form a first task or first pipeline section. Then, in step S50, the data processing system 20 checks to see if any additional pipeline sections are needed. If so, the control routine returns to step S30 to call the next function from the library. Accordingly, the control routine loops through steps S30–S50 until no further tasks are needed. At this point the control routine continues to step S60.

At step S60, the pipeline is invoked. In step S70, the pipeline returns the processed data element to the host application. Then, in step S80, the data processing system 20 determines if any additional data is needed. If so, the control routine returns to step S60 to again invoke the pipeline.

However, if no further data is needed, the control routine continues to step S90, where the pipeline is removed by de-allocating the memory allocated to the various pipeline sections. In step S100, the next command of the host application is run. Then, in step S110, the data processing system 20 determines if any further pipelines are needed. If so, the control routine returns to step S30.

However, if a pipeline is not needed at this point, the control routine continues to step S120, where the data processing system 20 determines if the host application 120 is finished. If so, the control routine stops. Otherwise, the control routine returns to step S100.

FIG. 9 shows the flowchart for the instantiating step S40. After entering the instantiating routine in step S40, the control routine continues to step S200, where the primary data structure for the task is created. Then, in step S210, the portion of the data structure specific to this task is created. Then, in step S220 the channel data structures are created, and in step S230 the backward link is created. If a forward link is necessary, its data structure is defined, but it will not be finished until the pipeline is invoked, as the downstream task to which the forward link links has not yet been created. The link comprises a procedure pointer for calling the linked pipeline section. Then, in step 5240, the control routine returns to step S40.

FIG. 10 shows the flow chart for the invoking routine of step S60. Starting from step S60, the control routine continues to step S300 where the host application 120 requests data from the last pipeline section. Then, in step S310, the current pipeline section requests data from the next upstream pipeline section. In step S320, the data processing system 20 determines if the next pipeline section is the first pipeline section. If not, the control routine returns to step S310.

However, if the next pipeline section is the first pipeline section, the control routine continues to step S330. In step S330, the the data processing system 20 determines if the first pipeline section is a "null" section. If not, the control routine continues to step S340, where the first pipeline section obtains the data element from an external source. If the first pipeline section is a "null" section, the control routine continues to step S350, where the first pipeline section self-generates the data element.

In either case, after either step S340 or S350, the control routine continues to step S360, where the first pipeline section returns the data to the immediately downstream pipeline section. In step S370, the next pipeline section processes the data. Then, in step S380, if the next pipeline section is the last pipeline section, the processed data is returned to the host application in step S390. However, if the next pipeline section is not the last pipeline section, the data is returned to a new immediately downstream pipeline section and the data element is processed, as shown by the loop back to step S360. This "looping" continues until the last pipeline section is reached and the data is returned to the host application in step S390. The control routine then returns to step S60.

In another embodiment of the data processing pipeline of this invention, a forward link, either replacing or in addition to the previously defined backward link is provided. In this case, after the backward link from the current downstream most task is defined, a forward link from the immediately upstream task to the downstream-most task is defined.

Alternately, only a forward link need be provided. However, in this case, the pipeline sections are initialized from the host application, upstream, towards the data source. The pipeline is then invoked from the data source downstream to the host application.

In a further embodiment, rather than providing a single forward link or a single backward link between tasks, when each task has two or more data processing channels, the channels themselves are linked together by the forward and/or backward links. In this case, each channel could be backward or forward linked to any other corresponding channel of any one of the tasks. Thus, one of the channels of a first pipeline section may be linked to the corresponding channel of a second pipeline section, while another channel of the first pipeline section is linked to the corresponding channel of a third pipeline section.

In yet another embodiment of the present invention, special "fan-in" and "fan-out" pipeline sections are provided. In these pipeline sections, two or more upstream pipeline sections may be linked to a single downstream pipeline section using a fan-in branching pipeline section. Similarly, a single upstream pipeline section may be connected to two or more downstream pipeline sections using a fan-out branching pipeline section.

In an application of this systems as shown in FIGS. 11-14, a system is created to emulate a stream-oriented UNIX® pipeline which very efficiently processes an image on a scanline-by-scanline basis. The UNIX® pipeline has a number of advantages, including modularity and easy maintenance. However, the UNIX® pipeline has a number of disadvantages, including requiring a multi-processing processor, lack of portability, lack of an ability to dynamically reconfigure itself, and the need for system overhead in task scheduling and data flow handling.

In an image processing pipeline according to the invention, the image is divided into two major parts, a header and an image body. The header defines the state of the image, such as the color space it is represented in, its orientation, and its dimensions, such as the length of a scanline, the number of scan lines, the interlace factor, the pitch or the like. The image body comprises the actual scanline data, in raster output scanner form or the like, where each scanline is one data element to be passed through the pipeline. In this type of image processing pipeline, the image body comprises multiple repititions of the same scanline structure.

The pipeline sections each contain at least three channels. The first channel is used to process the header information. The second channel is used to process the image body, on a scanline-by-scanline basis. One or more second channel-type channels can be provided, depending upon the type of image processing provided by the pipeline. The third channel is used to perform any required clean-up activities, and to release the memory allocated to the pipeline sections once an image has been fully processed. Because the image processing is complete by the time this third channel is invoked, the only data flowing through the third channel is error handling information. The third channel causes each upstream pipeline section to return any error codes resulting from the image processing, and once this information is returned, to cause the receiving downstream pipeline section to dynamically delete the upstream pipeline section. In addition, any necessary external port procedure pointers are included in the data structure of the pipeline sections of this image processing pipeline.

In the image processing system shown in FIGS. 11-14, the generalized task means 68 of FIG. 16 comprises a first channel means 84a as a header channel, a second channel means 84b as an image processing channel and a third channel means 84c as an end channel.

As described above, when the host application determines that processed data is needed, a data processing pipeline is created. The pipeline is created by instantiating various library functions from the function library 10. In an image processing system, these functions could include "invert", which inverts the colors of the image; "colorize" which colorizes a black and white image; "filter", which does a convolution filter to, for example, soften the edges within the image; "enlarge" which enlarges the image body; and "reduce", which reduces the image body. This list is merely illustrative and is not intended to be exhaustive. For example "invert" will change black pixels to white pixels, and vice-versa. In addition, invert will change color pixels, for example, from red to cyan, green to magenta and blue to yellow.

An example of data processing performed by a data processing pipeline will now be described with reference to FIG. 11. The example will describe data processing of a color image data block provided by a color image scanner. In this example, the pipeline is capable of dynamically reconfiguring itself to overcome detected errors.

Figure 11:
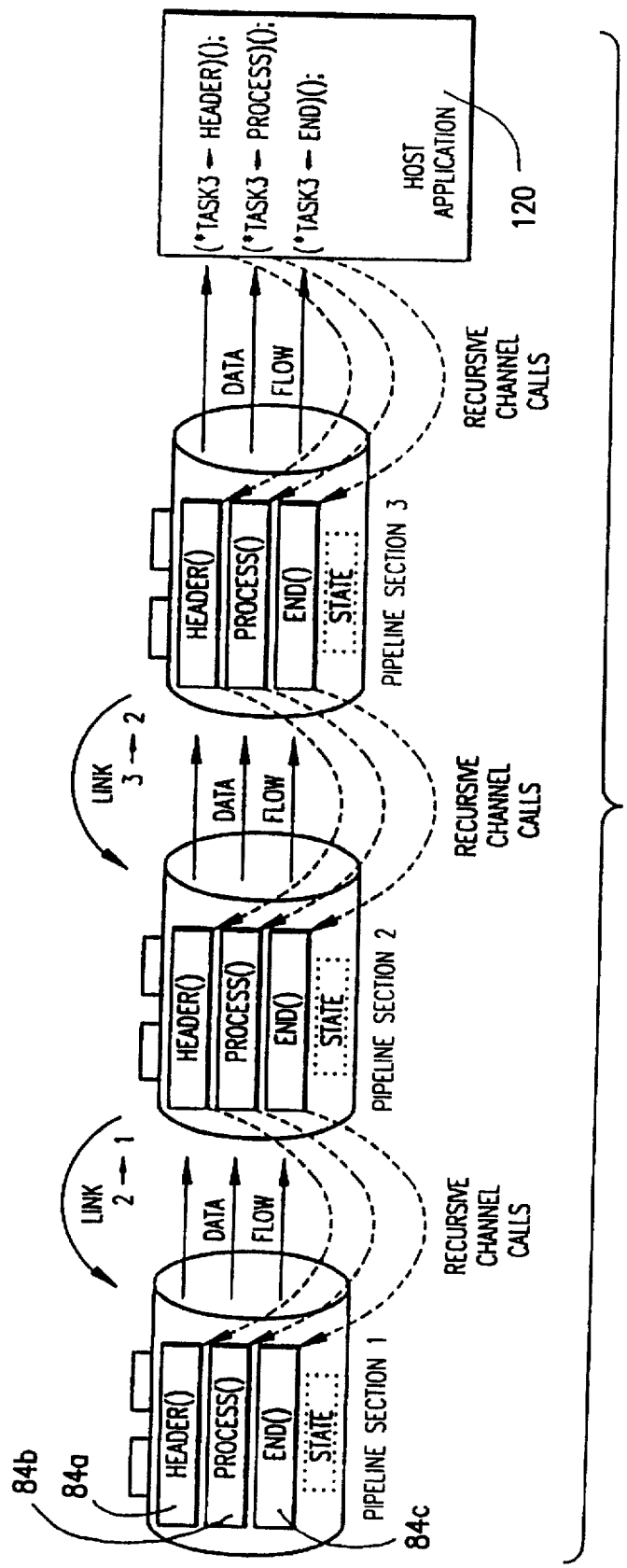
FIG. 11 shows a data processing pipeline.

In this example, the host application instantiates data processing functions from a function library to create a data processing pipeline to receive and process a four color image that is then printed by the host application on a four color printer, as shown in FIG. 11. The pipeline is then invoked by the host application to input the header data of the image from the color scanner. The request for the header travels up channel 1 of the pipeline, until it reaches the first pipeline section. The first pipeline section obtains the header data from the scanner, and returns it down channel 1.

As each pipeline section receives the header, it checks the received header to ensure that it can correctly process the image data it will receive, then the pipeline section alters the header to reflect what the pipeline section will do to the image data. The pipeline section will then send the altered header data to an adjacent downstream pipeline section. However, if a pipeline section determines that the image data it will receive cannot be properly processed, the pipeline section will dynamically reconfigure the pipeline to overcome the problem.

If the pipeline is created assuming the color scanner is a four color scanner, but it turns out that the color scanner is a three color scanner instead of a four color scanner, the header data for the color image received from the scanner will indicate the image is a three color image. Because the pipeline was originally set up assuming the scanner and the printer use four color data, an error will occur. In this case, the potential error is discovered when the pipeline sections process the header data.

The pipeline section which detects the error automatically reconfigures the pipeline by instantiating and adding a new pipeline section immediately upstream of itself. The new pipeline section will alter the color space of the image data from three color to four color. At the same time, the pipeline section which detects the error alters the links to reflect the position of the new pipeline section. The header data is then rerun. Now, after the new pipeline section alters the header to reflect that it changes the color space of the image to four color image data, the pipeline section that detected the error will determine that it can correctly process the image data.

Figure 12:
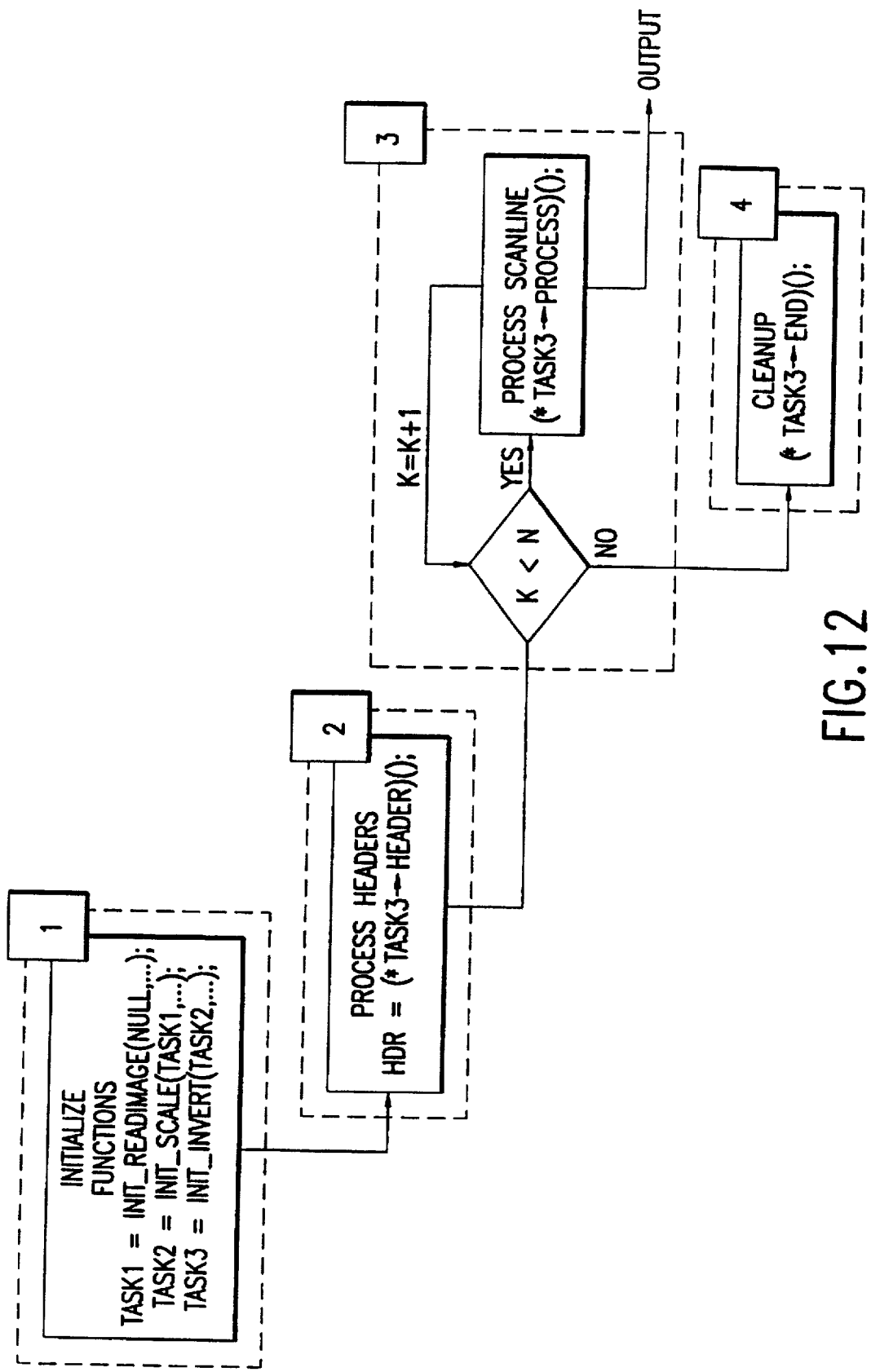
FIG. 12 shows a flow chart for forming and running the pipeline of FIG. 11.

Once the header is completely processed and returned to the host application, the host application repeatedly invokes the pipeline to input the image body. Each time the pipeline is invoked, one scanline of the image body is obtained, processed and returned to the host application as a processed data set. From the header, the host application will know how many scanlines are in the image body, so that it will know how many invoking cycles it will take to input and process the entire image body. In all other respects, the pipeline works as described above in general. Once the entire image body is obtained, processed and returned to the host application, the host application invokes the third channel to shut down the pipeline. FIG. 12 shows a flow chart illustrating the execution of this pipeline.

In the pipeline systems described above, when a task is instantiated, it is actually placed in a section of the RAM memory, and some variables and process parameters are preset. The task is not "initialized" until the task has processed the header data. As described above, the first information processed by the data pipeline is the header data, which ripples down channel 1 of the pipeline. When a task first receives the header data from an immediately upstream task, the task is able to complete its own initialization procedure, wherein all variable values and process parameters are finally set.

As described above, if a pipeline section analyzes the header data and determines that it is not needed to process the data, the pipeline section can take steps to short circuit itself out of the pipeline. The short circuiting procedure can occur in at least two different ways. In a first instance, a pipeline section can receive image data from the upstream task to which it is linked and simply pass the image data on to the next downstream task unaltered. In a second instance, if both backward and forward links are provided, the unnecessary task can use external procedures to alter the links of the pipeline so that the immediately upstream task passes its image data directly to the immediately downstream task. This is accomplished by having the unnecessary task alter the link pointer of the immediately downstream task to which it is linked so that the link pointer points to the task which is immediately upstream of the unnecessary task.

In either of the short circuiting methods described above, unnecessary processing time and computer resources will be devoted to instantiating the unnecessary task. In addition, if the first short circuiting method is used, where the unnecessary task remains in memory and simply passes the image data on unaltered, additional unnecessary processing steps will occur that cost additional processing time. An alternate embodiment of the invention will now be described which overcomes these drawbacks.

In the alternate embodiment of the invention each of the tasks, or pipeline sections, only include the second and the third processing channels. The header data is read by each of the tasks when it is first instantiated by the host application. If, upon instantiation, a task decides that it is not needed to process the data, the instantiation procedure is cancelled and the host application moves on to the next task. In this embodiment, unnecessary tasks are not instantiated to begin with. As a result, no system resources are wasted instantiating unnecessary tasks or performing needless processing steps.

Figure 17:
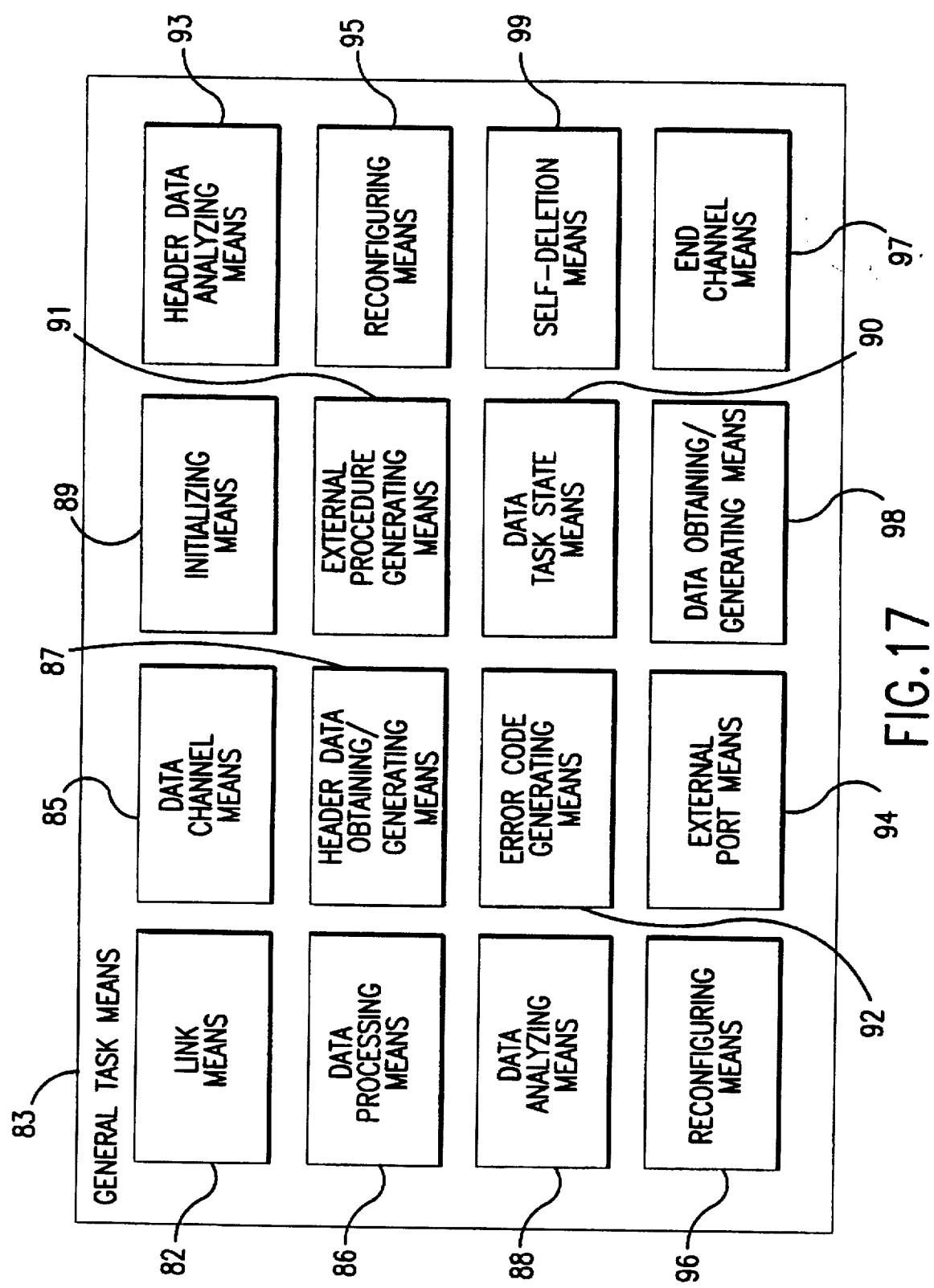
FIG. 17 shows a block diagram of a second generalized task of the present invention.

A generalized task means 83 of this alternate embodiment will now be described with reference to FIG. 17. The generalized task means 83 could be any of the task means of a pipeline according to the alternate embodiment.

The generalized task means 83 comprises a link means 82, data channel means 85 (which could comprise plural separate data channels 85a, 85b, etc.), a data processing means 86, a data analyzing means 88, error code generating means 92, task state means 90, reconfiguring means 96, external port means 94 and data obtaining/generating means 98. Each of these means were previously described in reference to the generalized task means shown in FIG. 16. The generalized task means 83, shown in FIG. 17, may also include a header data obtaining/generating means 87 for obtaining a header from a data source or for generating a header, initializing means 89 for initializing the task based on the obtained/generated header data, header data analyzing means 93 for analyzing obtained/generated header data to determine if the task is capable of processing data to be received from an upstream task, reconfiguring means 95 for reconfiguring the pipeline, self-deletion means 99 for canceling an instantiation process when the task determines it is not needed to process the data to be received from an upstream task, and end channel means 97 for collecting generated error codes and for shutting down the pipeline. The generalized task means 83 may also include external procedure generating means 91 for generating an external procedure that is callable by other tasks of the pipeline to obtain access to the state or links of the task to facilitate reconfiguration of the pipeline. Of course it should be understood that a particular instantiated task may include combinations of these basic features and that not all of the above-described features are necessary to practice the invention.

Figure 13:
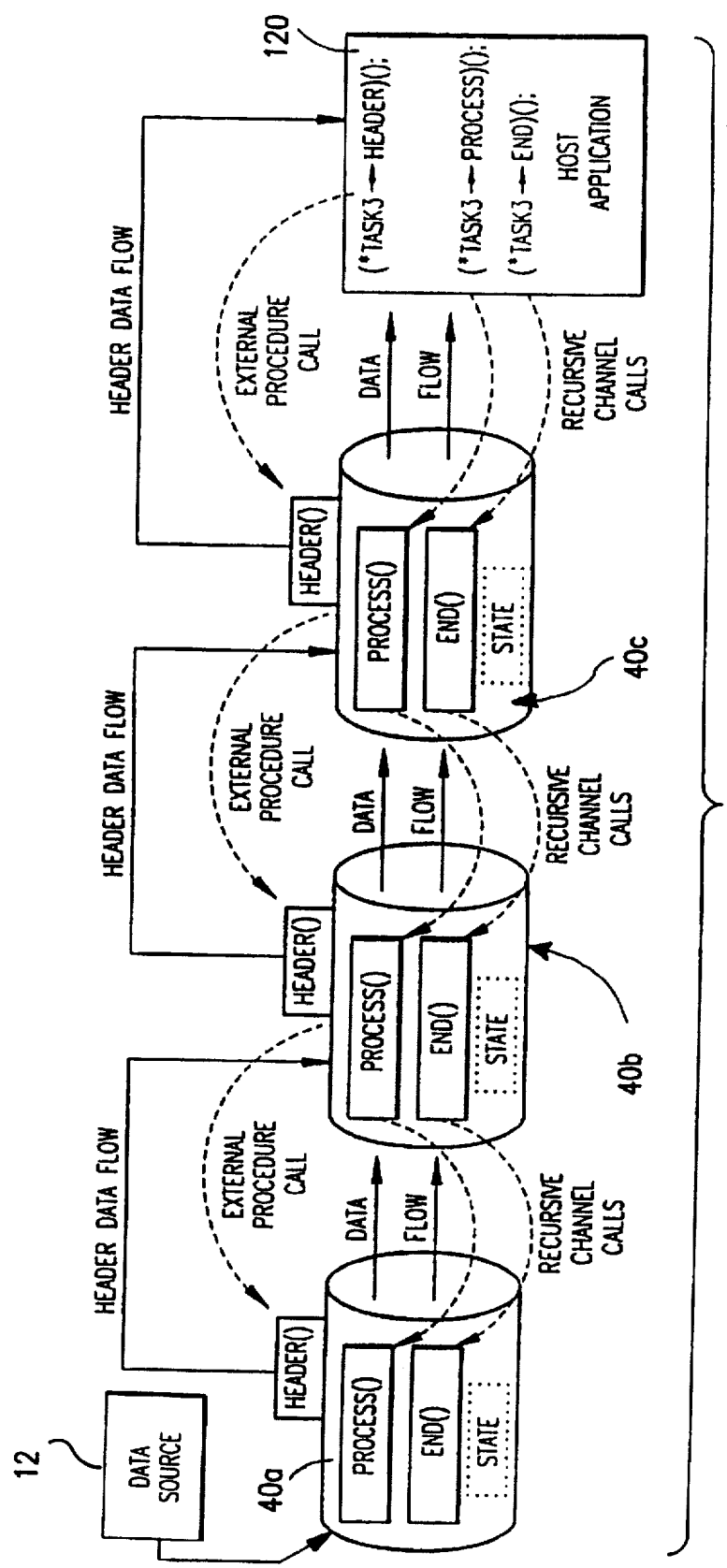
FIG. 13 shows a second embodiment of a data processing pipeline.
Figure 14:
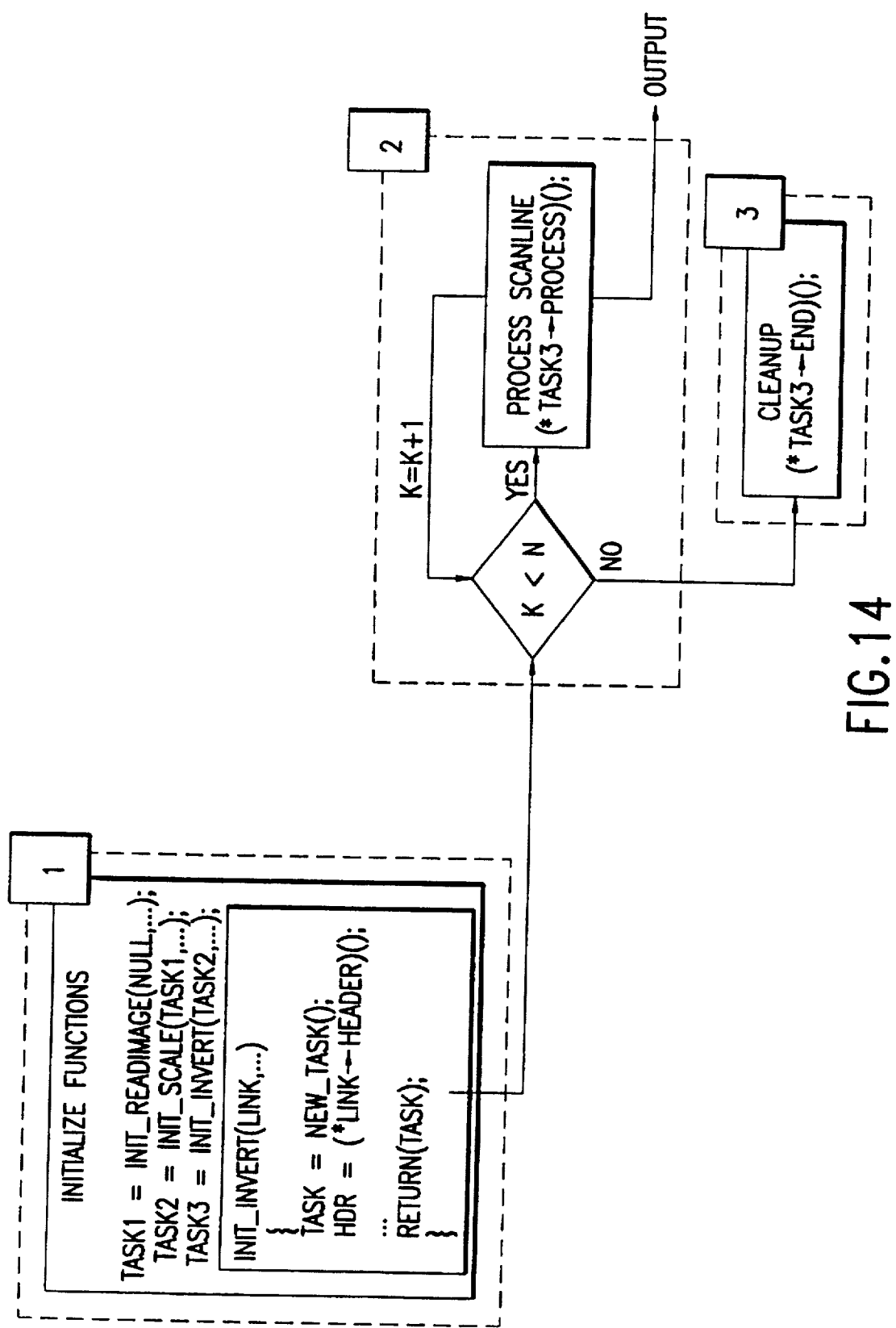
FIG. 14 shows a flow chart for forming and running the data processing pipeline of FIG. 13.

A pipeline according to the alternate embodiment will now be described with reference to FIGS. 13 and 17. When the host application begins to create a pipeline, it will instantiate the first pipeline section 40a, and the first pipeline section 40a will immediately either read header data from a data source 12, or generate header data. The first pipeline section 40a will initialize all its variables and process parameters in accordance with the header data. The first pipeline section 40a will also create an external procedure using its external procedure generating means 91, which allows other pipeline sections to read header data directly from the first pipeline section 40a. After the first pipeline section 40a has processed the header data, initialized itself, and created the external procedure, the host application will then instantiate the second pipeline section 40b.

The second pipeline section 40b will call the external procedure set up by the first pipeline section 40a to obtain the header data from the first pipeline section 40a. The second pipeline section 40b will analyze the header data to determine if it is needed in the data processing pipeline. If the second pipeline section 40b determines that its image processing is required, it will initialize all its variables and process parameters based on the header data, and it will process the header data to reflect the data processing it will perform. The second pipeline section 40b will then create a new external procedure using its external procedure generating means 91 to allow other pipeline sections to read its processed header data.

In this alternative embodiment, if a pipeline section determines that its image processing steps are not necessary for the image processing pipeline, the pipeline section will delete itself from memory and return control back to the host application. The host application will then proceed to instantiate the next pipeline section. As a result, no memory is wasted instantiating unnecessary pipeline sections, and no processing time is lost passing image data through a pipeline section which will not perform any data processing steps.

For example, assume a reduce/enlarge pipeline section is being instantiated by the host application to receive image data from an upstream pipeline section and to reduce or enlarge the received image, as necessary, to create an image that is 1000×1000 pixels. During instantiation of the pipeline section, the section will obtain header data from the adjacent upstream pipeline section by calling the external procedure created by the adjacent upstream pipeline section. If the header data indicates that the image data to be provided by the upstream pipeline section will already be 1000×1000 pixels, the reduce/enlarge pipeline section will be unnecessary. Accordingly, the reduce/enlarge pipeline section will delete itself from memory, and the host application will proceed to instantiate the next pipeline section.

When the last pipeline section 40c has been instantiated, the last pipeline section 40c will create an external procedure which allows the host application to read the processed header data from the last pipeline section 40c. The host application will obtain the header data by calling the external procedure, then make its first data call to the last pipeline section 40c to begin processing data. As described above for the other embodiments of the invention, the request for data will ripple up to the first pipeline section 40a, the first pipeline section 40a will obtain the first line of image data from the data source 12 (or it will generate a line of image data), the first pipeline section 40a will return the image data to the adjacent downstream pipeline section, and the processed image data will ripple down through each of the pipeline sections until it reaches the host application.

After all of the image data for a particular image has been received by the host application, the host application will use the end channel means 97 to gather any error codes and to shut down the pipeline by deallocating the memory used for each of the pipeline sections.

In this alternate embodiment, not only are unnecessary pipeline sections never instantiated, but each of the pipeline sections will be initialized immediately after instantiation. This can further reduce the time required to set up a pipeline and process image data using the pipeline.

In addition, in the alternative embodiment, if a pipeline section analyzes header data received from an upstream pipeline section, and determines that it will be unable to process the image data it will receive from the upstream pipeline section, the pipeline section can instantiate a new pipeline section and insert the new pipeline section between itself and the original upstream pipeline section. This process is similar to the process described above for the other embodiments. In this alternative embodiment, however, the newly inserted pipeline section must receive the header data from the immediately upstream pipeline section either directly through an external procedure call to the immediately upstream pipeline section, or from the pipeline section which created the new pipeline section. In either event, the newly created pipeline section will analyze the header data, initialize its variables and process parameters, process the header data, set up an external procedure which allows other pipeline sections to obtain its processed header data, then it will return control back to the pipeline section which created it. The pipeline section which created the new pipeline section will obtain the processed header data from the new pipeline section and ensure that it can now process the image data being provided to it. If so, the pipeline construction will proceed normally. If the pipeline section is still unable to process the image data, it can insert yet another new pipeline section.

For example, assume a rotate pipeline section is being instantiated that requires four color image data from an adjacent upstream pipeline section. During instantiation, the rotate pipeline section will obtain header data from the upstream pipeline section by calling an external procedure. If the header data indicates that the image data being passed to the rotate pipeline section is three color image data, the rotate pipeline section will known that it will be unable to process the image data. To solve the problem, the rotate pipeline section will cause a new "color change" pipeline section to be instantiated that will change the image data from three color image data to four color image data. This new color change pipeline section will be linked to the upstream pipeline section, and the new color change pipeline section will obtain and process the header data from the upstream pipeline section as part of its instantiation. The new color change pipeline section will then create an external procedure to allow other pipeline sections to obtain processed header data from it, and it will return control back to the rotate pipeline section. The rotate pipeline section will then call for header data from the new color change pipeline section, and complete its own initialization.

A pipeline section that is being instantiated may also be provided with the capability to replace itself with a different pipeline section that is more efficient. For instance, assume a reduce/enlarge pipeline section is being instantiated to receive image data of any size from an upstream pipeline section, and to convert the image data to 1000×1000 pixel image data. When the reduce/enlarge pipeline section gets header data from the upstream pipeline section it may discover that the image data it will receive is already 500×500 pixel image data. The reduce/enlarge pipeline section may also know that a different data processing function in the function library designed to multiply the size of an image by an integer can more efficiently process the image data to create image data that is 1000×1000 pixels. In this instance, the reduce/enlarge pipeline section would cause the multiply by an integer function to be instantiated and linked to the upstream pipeline section, and it would cause itself to be deleted from memory. The end result is a faster, more efficient data processing pipeline.

While the invention has been described in connection with preferred embodiments, it is to be understood that the invention is in no way restricted to the embodiments described herein. Various changes, modifications, or improvements may be made in the invention without departing from the spirit of the invention, and without exceeding the scope of the invention as expressed in the following claims.

What is claimed is:

1. A data processing system for pipeline data processing of a data unit, the data unit comprising a header portion and a body portion, the body portion comprising a plurality of data sets, the data processing system comprising:

a single tasking processor;

a memory;

memory management means for allocating blocks of the memory;

library means for storing data processing functions; and host application means for creating a data processing pipeline and obtaining processed data from the pipeline, comprising:

instantiating means for creating a data processing pipeline of linked data processing tasks, each task being stored in a memory block of memory, each task being an instantiation of a data processing function from the library means, and invoking means for requesting data sets from the data processing pipeline, and wherein each task of said data processing pipeline comprises:

link means for linking the task to at least one of another task in the pipeline, a data source, and the host application, data channel means for passing data sets between the tasks, external port means for providing header data from within the task to at least one of another task and the host application, header data obtaining means for obtaining header data from one of a data source, another task, and a header data generator via the external port means, initializing means for initializing the task based upon the header data upon instantiation, external procedure generating means for generating an external procedure callable by at least one of another task and the host application, the external procedure providing header data from within the task to the host application or task that calls the external procedure, and data obtaining means for obtaining data sets from one of the data source, another task, and a data set generator.

2. The data processing system of claim 1, wherein, the instantiating means of the host application comprises:

instantiation means for instantiating a function from the library means to create a first task of the pipeline, and for instantiating a function from the library means to create at least one additional task of the pipeline; and header data obtaining means for calling an external procedure to obtain processed header data from a downstream-most task in the pipeline.

3. The system of claim 2, wherein the header data obtaining means of an upstream-most task of the pipeline comprises means for obtaining header data from one of a data source and a header data generator, and wherein the header data obtaining means of additional instantiated tasks of the pipeline comprise means for calling an external procedure to obtain processed header data from another task of the pipeline.

4. The data processing system of claim 2, wherein the invoking means of the host application comprises means for requesting processed data sets from the pipeline after the host application has created the data processing pipeline.

5. The data processing system of claim 1, wherein at least one task of the pipeline further comprises header data analyzing means for determining if the task will be able to process the data sets the task will receive.

6. The data processing system of claim 5, wherein the at least one task of the pipeline further comprises reconfiguring means for reconfiguring the pipeline when the header data analyzing means of the task determines that the task will not be able to process the data sets the task will receive.

7. The system of claim 6, wherein the reconfiguring means further comprises means for instantiating at least one additional task, and for modifying the links between the tasks of the pipeline to insert the at least one additional task into the data processing pipeline upstream of the at least one task, so that the data sets received by the at least one task are processable by the at least one task.

8. The system of claim 1, wherein at least one task of the data processing pipeline further comprises self-deletion means for analyzing received header data when the task is instantiated, for determining if the data sets to be received by the task need to be processed by the task, and for causing the task to be removed from the pipeline when the self-deletion means determines that the data sets to be received do not need to be processed by the task.

9. The system of claim 8, wherein said self-deletion means further comprises means for causing the at least one task to be removed before additional tasks of the pipeline are instantiated.

10. The system of claim 1, wherein each task further comprises:

error code generating means for generating error codes; and end channel means for communicating error codes between the tasks of the pipeline.

11. The data processing system of claim 10, wherein each task further comprises task deletion means for deleting another task in the pipeline from memory.

12. The data processing system of claim 11, wherein the host application further comprises task deletion means for causing the tasks to be deleted.

13. The data processing system of claim 1, wherein the host application further comprises error code accumulation means for accumulating all error codes generated by the tasks of the pipeline.

14. A method for pipeline data processing a data unit in a single tasking environment, the data unit comprising a header portion and a body portion, the body portion comprising a plurality of data sets, the method comprising the steps of:

running a host application in a single tasking environment;

creating a data processing pipeline using the host application, the data processing pipeline providing processed data sets to the host application and comprising a first task and at least one additional task, the first and the at least one additional tasks being linked together and being stored in blocks of memory, the host application being linked to a downstream-most task in the pipeline;

instantiating a first task, the first task obtaining or generating header data, initializing itself based on the header data upon instantiation, and generating an external procedure that is callable by at least one of another task and the host application, the external procedure providing the other task or the host application with header data from the first task;

invoking the pipeline using the host application to obtain processed data from the pipeline.

15. The method of claim 14, wherein each of the tasks of the pipeline control a processor of the single tasking environment to accomplish their data processing.

16. The method of claim 14, wherein the step of creating the data processing pipeline comprises the steps of:

instantiating at least one additional task.

17. The method of claim 16, wherein during the step of instantiating at least one additional task each at least one additional task performs the steps of:

calling an external procedure to obtain header data from an upstream task, initializing itself based on the obtained header data, processing the obtained header data to reflect the data processing the task will perform, and generating an external procedure callable by at least one of another task and the host application, the external procedure providing the other task or the host application with the processed header data from the additional task.

18. The method of claim 16, wherein, during the step of instantiating the at least one additional task each at least one additional task performs the steps of:

analyzing the header data obtained from an immediately upstream task;

determining if the at least one additional task is needed to process the data sets it will receive from an upstream task; and removing the at least one additional task from memory before another task is created, so that the task never appears in the pipeline, when it is determined that the at least one additional task is not needed to process the data sets it will receive.

19. The method of claim 16, wherein during the step of instantiating the at least one additional task the at least one additional task performs the steps of:

analyzing header data obtained from an upstream task to determine if the task will be able to process the data sets it will receive;

determining if the pipeline can be reconfigured by the addition of at least one new task, upstream in the pipeline, such that the data sets to be received by the task will be processable by the task when the task determines that the data to be received from an upstream task will not be processable by the task; and instantiating at least one new task, and modifying the links between the tasks, so that at least one new task is inserted into the data processing pipeline upstream of the task, when it is determined that the addition of the at least one new task will cause the data sets to be received by the task to be processable by the task.

20. The method of claim 14, wherein the step of invoking the pipeline comprises the steps of:

(a) requesting a data set from a downstream-most task in the pipeline with the host application;

(b) requesting a data set from an adjacent upstream task with the downstream-most task;

(c) each additional task in the pipeline, in turn, requesting a data set from an adjacent upstream task until the request for a data set reaches an upstream-most task in the pipeline;

(d) the upstream-most task in the pipeline obtaining a data set from one of a data source, and a data set generator, and providing the data set to an adjacent downstream task in the pipeline;

(e) each additional task in the pipeline, in turn, receiving a data set from an upstream task, processing the received data set, and providing the processed data set to an adjacent downstream task in the pipeline, until the processed data set is provided to the downstream-most task in the pipeline;

(f) the downstream-most task in the pipeline processing the data set and providing the processed data set to the host application.

21. The method of claim 20, wherein the step of invoking the pipeline further comprises the step of:

repeating steps (a)–(f) until the host application has received all the data sets comprising the body portion of a data item.

22. The method of claim 14, further comprising the step of:

accumulating all generated error codes from the tasks of the pipeline and removing the pipeline from memory.

23. The method of claim 22, wherein the accumulating step further comprises the steps of:

issuing a command to a downstream-most task in the pipeline to accumulate all generated error codes and to remove the pipeline from memory with the host application;

communicating the command to accumulate all generated error codes and remove the pipeline from memory to an adjacent upstream task with the downstream-most task;

each additional task, in turn, communicating the command to accumulate all generated error codes and remove the pipeline from memory to an adjacent upstream task, until the command reaches an upstream-most task;

communicating any generated error codes to an adjacent downstream task with the upstream-most task;

each additional task receiving any generated error codes from an adjacent upstream task, causing the adjacent upstream task to be removed from memory, adding any error codes the additional task generated to the error codes received from the upstream task, and communicating all accumulated error codes to an adjacent downstream task, until the accumulated error codes are communicated to the downstream-most task;

communicating all accumulated error codes to the host application with the downstream-most task; and causing the downstream-most task to be removed from memory with the host application.

* * * * *